US012770951B2

(12) United States Patent
Dawley et al.

(10) Patent No.: US 12,770,951 B2
(45) Date of Patent: Oct. 20, 2026

(54) POWER CONNECTOR SYSTEM

(71) Applicant: TE Connectivity Solutions GmbH, Schaffhausen (CH)

(72) Inventors: Evan Dawley, Troy, MI (US); Christopher Ryan Raybold, Middletown, PA (US); Romit Sarkar, Kernersville, NC (US)

(73) Assignee: TE Connectivity Solutions GmbH (CH)

( * ) Notice: Subject to any disclaimer, the term of this patent is extended or adjusted under 35 U.S.C. 154(b) by 519 days.

(21) Appl. No.: 18/503,026

(22) Filed: Nov. 6, 2023

(65) Prior Publication Data

US 2024/0396112 A1 Nov. 28, 2024

Related U.S. Application Data

(60) Provisional application No. 63/504,079, filed on May 24, 2023.

(51) Int. Cl.

| | |
|---|---|
| ***H01M 10/613*** | (2014.01) |
| ***H01M 10/48*** | (2006.01) |
| ***H01M 50/202*** | (2021.01) |
| ***H01M 50/505*** | (2021.01) |
| ***H01M 50/547*** | (2021.01) |
| ***H01M 50/557*** | (2021.01) |

(52) U.S. Cl.

CPC ....... *H01M 10/613* (2015.04); *H01M 10/482* (2013.01); *H01M 50/202* (2021.01); *H01M 50/505* (2021.01); *H01M 50/547* (2021.01); *H01M 50/557* (2021.01)

(58) Field of Classification Search

CPC ............. H01M 10/482; H01M 10/613; H01M 50/202; H01M 50/204; H01M 50/296; H01M 50/505; H01M 50/547; H01M 50/557

See application file for complete search history.

(56) References Cited

U.S. PATENT DOCUMENTS

| | | | | |
|---|---|---|---|---|
| 2023/0246289 | A1* | 8/2023 | Pröll | B60L 1/003 429/82 |
| 2024/0237314 | A1* | 7/2024 | Stevens | H01M 10/486 |
| 2024/0332666 | A1* | 10/2024 | Bauer | H01M 10/653 |

* cited by examiner

*Primary Examiner* — Timothy C Cleveland

(57) ABSTRACT

A battery module includes a battery case that has a cavity configured to hold at least one battery cell. The battery case has a fluid manifold allowing cooling fluid to flow through the cavity. The battery module includes a battery terminal coupled to the battery case. The battery terminal is configured to be electrically connected to the at least one battery cell. The battery terminal includes a mating element configured to be mated to and electrically connected to a mating power element to electrically connect the mating power element and the at least one battery cell. The battery terminal includes a cooling channel to form a fluid path through the mating element. The cooling channel is in flow communication with the fluid manifold for fluid to flow through the battery case.

22 Claims, 18 Drawing Sheets

POWER CONNECTOR SYSTEM

CROSS REFERENCE TO RELATED APPLICATIONS

This application claims the benefit of U.S. Provisional Application No. 63/504,079 filed May 24, 2023, the subject matter of which is herein incorporated by reference in its entirety.

BACKGROUND OF THE INVENTION

The subject matter herein relates generally to power connector systems.

Power connectors are used to transmit power between various components in a system. Power may be transmitted by the power connectors between a battery and a load or between a charging inlet and a battery. For example, power connectors within a vehicle, such as an electric vehicle or a hybrid electric vehicle, may be used to supply power from the battery to another component within the vehicle or may be used to recharge the battery through a charging inlet. It may be desirable to provide a separable interface between the power connectors to allow connection and disconnection, such as for service or replacement of components. The interface between the power connectors may be susceptible to damage or failure, such as from overheating during power transmission. As such, current or operating time may be limited to protect the components from overheating. Some systems use cooling to cool the components. However, the cooling systems add numerous components and complexity to the system, which adds cost to the overall system.

A need remains for a power connector system that may be manufactured in a cost effective manner and operated in a reliable manner.

BRIEF DESCRIPTION OF THE INVENTION

In one embodiment, a battery module is provided and includes a battery case that has a cavity configured to hold at least one battery cell. The battery case has a fluid manifold allowing cooling fluid to flow through the cavity. The battery module includes a battery terminal coupled to the battery case. The battery terminal is configured to be electrically connected to the at least one battery cell. The battery terminal includes a mating element configured to be mated to and electrically connected to a mating power element to electrically connect the mating power element and the at least one battery cell. The battery terminal includes a cooling channel to form a fluid path through the mating element. The cooling channel is in flow communication with the fluid manifold for fluid to flow through the battery case.

In another embodiment, a battery module is provided and includes a battery case that has an outer shell to form a cavity configured to hold at least one battery cell. The battery case includes an end plate coupled to an end of the outer shell to close the end of the outer shell. The end plate has a fluid manifold to allow cooling fluid to flow through the end plate. The battery module includes a battery terminal coupled to the end plate. The battery terminal is configured to be electrically connected to the at least one battery cell. The battery terminal includes a mating element configured to be mated to and electrically connected to a mating power element to electrically connect the mating power element and the at least one battery cell. The battery terminal includes a cooling channel to form a fluid path through the mating element. The cooling channel is in flow communication with the fluid manifold for fluid to flow through the battery case.

In a further embodiment, a battery module is provided and includes a battery case that has an outer shell to form a cavity configured to hold at least one battery cell. The battery case includes an inlet end plate coupled to the outer shell. The inlet end plate has an inlet fluid port in flow communication with at least one fluid manifold. The battery case includes an outlet end plate coupled to the outer shell. The outlet end plate has an outlet fluid port in flow communication with the at least one fluid manifold. The battery module includes a first battery terminal coupled to the inlet end plate. The first battery terminal is configured to be electrically connected to the at least one battery cell. The first battery terminal includes a first mating element configured to be mated to and electrically connected to a first mating power element to electrically connect the first mating power element and the at least one battery cell. The first battery terminal includes a first cooling channel to form a fluid path through the mating element. The first cooling channel is in flow communication with the inlet fluid port for fluid to flow through the battery case. The battery module includes a second battery terminal coupled to the outlet end plate. The second battery terminal configured to be electrically connected to the at least one battery cell. The second battery terminal includes a second mating element configured to be mated to and electrically connected to a second mating power element to electrically connect the second mating power element and the at least one battery cell. The second battery terminal includes a second cooling channel forming a fluid path through the mating element. The second cooling channel is in flow communication with the outlet fluid port for fluid to flow through the battery case.

DETAILED DESCRIPTION OF THE INVENTION

Figure 1:
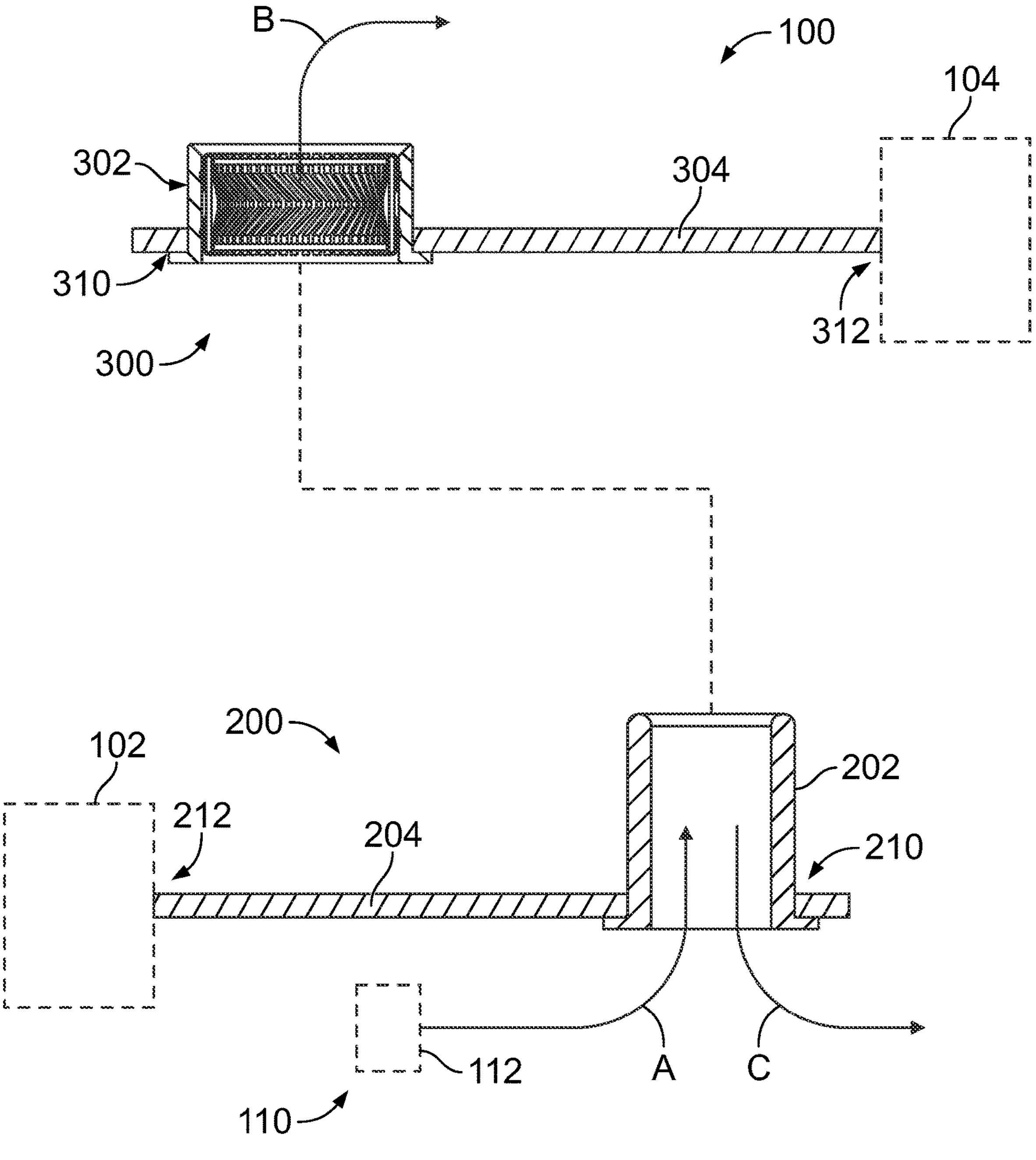
FIG. 1 illustrates a power connector system in accordance with an exemplary embodiment.

FIG. 1 illustrates a power connector system 100 in accordance with an exemplary embodiment. The power connector system 100 includes a first busbar assembly 200 and a second busbar assembly 300 configured to be coupled together to electrically connect a first electrical component 102 and a second electrical component 104. The first busbar assembly 200 is coupled to the first electrical component 102. The second busbar assembly 300 is coupled to the second electrical component 104. The first busbar assembly 200 is mated with the second busbar assembly 300 at a separable mating interface.

In various embodiments, the power connector system 100 is used in a vehicle, such as an electric vehicle or a hybrid electric vehicle. However, the power connector system 100 may be used in other systems, such as an industrial system, a communication system, a network system, a building, and the like. In an exemplary embodiment, the first electrical component 102 may be a load, such as a motor, that receives power from the battery. In other various embodiments, the first electrical component 102 may be a charging inlet for charging the battery. The second electrical component 104 may be a battery.

In an exemplary embodiment, the first busbar assembly 200 includes a male mating component and the second busbar assembly 300 includes a female mating component configured to be mated at the separable mating interface. For example, the first busbar assembly 200 includes a pin terminal 202 extending from a first busbar element 204. The second busbar assembly 300 includes a socket terminal 302 extending from a second busbar element 304. The pin terminal 202 is configured to be plugged into the socket terminal 302 to electrically connect the first busbar element 204 and the second busbar element 304.

In an exemplary embodiment, the first busbar element 204 extends between a first mating portion 210 and a second mating portion 212. The first mating portion 210 includes the pin terminal 202 and is configured to be mated to the socket terminal 302 of the second busbar assembly 300. The second mating portion 212 is configured to be electrically connected to the first electrical component 102. The first busbar element 204 is configured to transmit power between the socket terminal 302 and the first electrical component 102. The first busbar element 204 is electrically connected to the first electrical component 102, such as by a direct connection (for example, crimp, weld, bolt, threaded connection, and the like) or by using other conductors, such as a cable terminated to the end of the first busbar element 204.

In an exemplary embodiment, the second busbar element 304 extends between a first mating portion 310 and a second mating portion 312. The first mating portion 310 includes the socket terminal 302 and is configured to be mated to the pin terminal 202 of the first busbar assembly 200. The second mating portion 312 is configured to be electrically connected to the second electrical component 104. The second busbar element 304 is configured to transmit power between the pin terminal 202 and the second electrical component 104. The second busbar element 304 is electrically connected to the second electrical component 104, such as by a direct connection (for example, crimp, weld, bolt, threaded connection, and the like) or by using other conductors, such as a cable terminated to the end of the second busbar element 304.

In an exemplary embodiment, the power connector system 100 includes a cooling system 110 supplying cooling fluid flow to the mating interface between the first and second busbar assemblies 200, 300. The cooling system 110 includes a cooling fluid supply line extending along path A. The cooling system 110 may be a closed loop system and include a cooling fluid return line extending along either path B or path C. For example, the cooling fluid return line may be coupled to the second busbar assembly 300 to return the cooling fluid along path B or the cooling fluid return line may be coupled to the first busbar assembly 200 to return the cooling fluid along path C. The supply and return lines may be tubes, pipes, manifolds, or other structures to contain and direct the flow of the cooling fluid through the system. In various embodiments, the cooling fluid may be liquid coolant circulated through the system. In other various embodiments, the cooling fluid may be airflow circulated through the system or passing through the power connector system 100 into the external environment. In an exemplary embodiment, the cooling system 110 includes a generator 112 for transferring the cooling fluid through the cooling system 110. The generator 112 may be a pump or other device configured to force the cooling fluid through the system.

Figure 2:
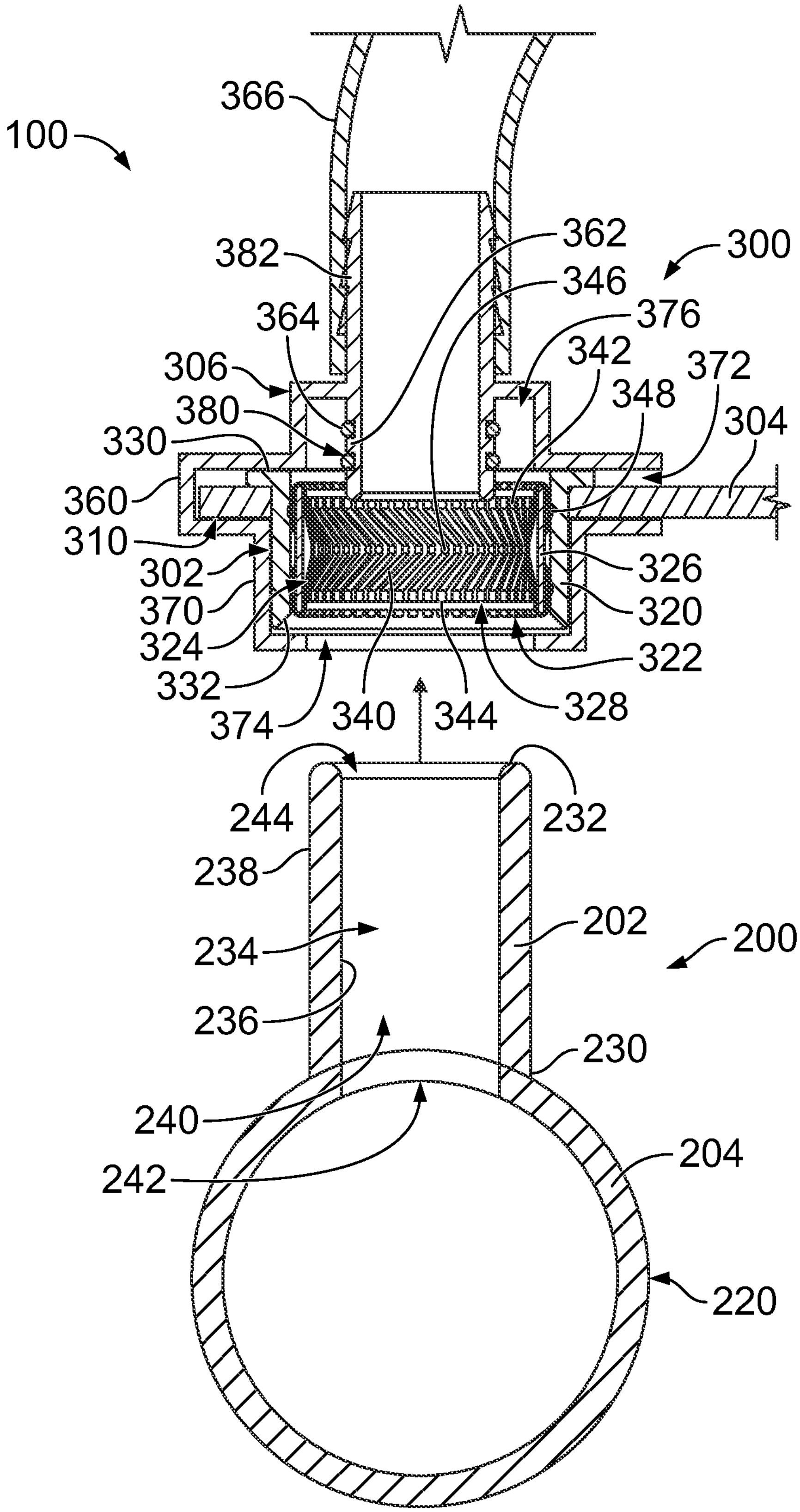
FIG. 2 is a cross-sectional view of a portion of the power connector system in an unmated state in accordance with an exemplary embodiment.
Figure 3:
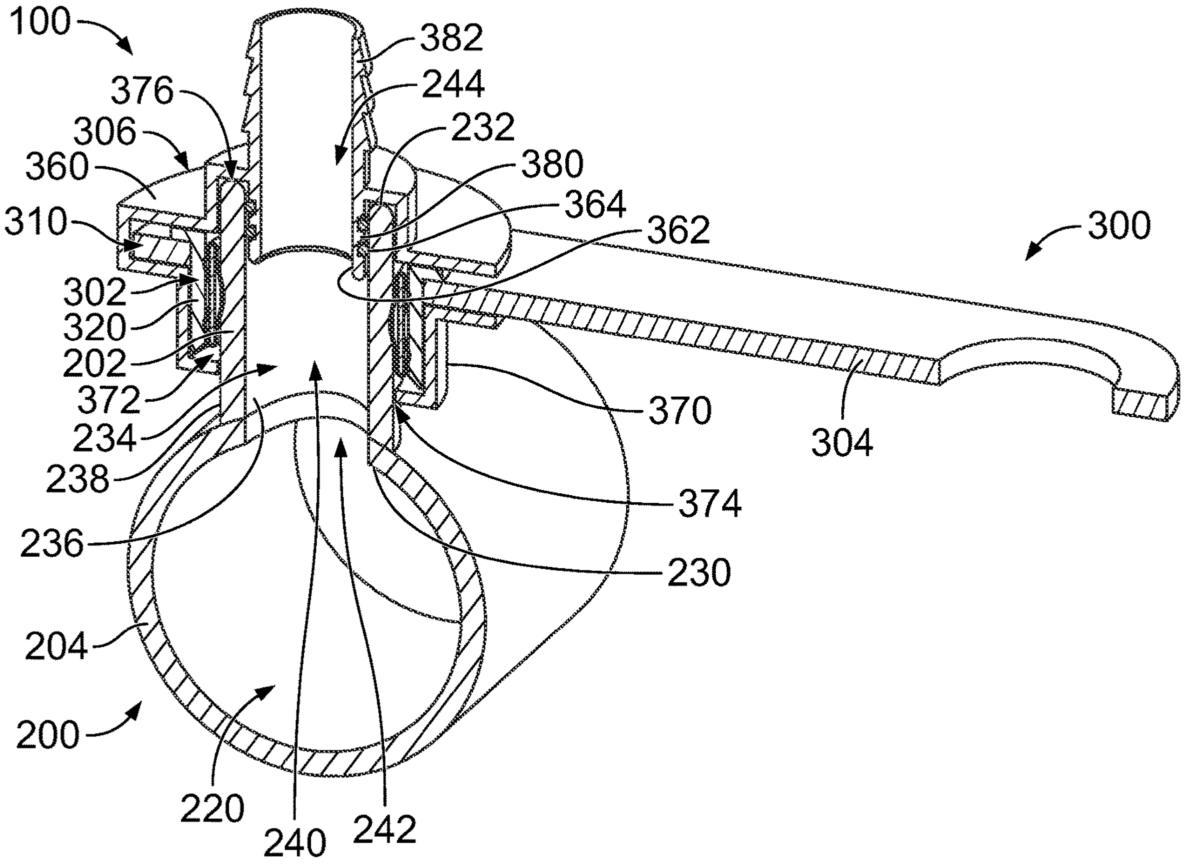
FIG. 3 is a sectional view of a portion of the power connector system in a mated state in accordance with an exemplary embodiment.
Figure 4:
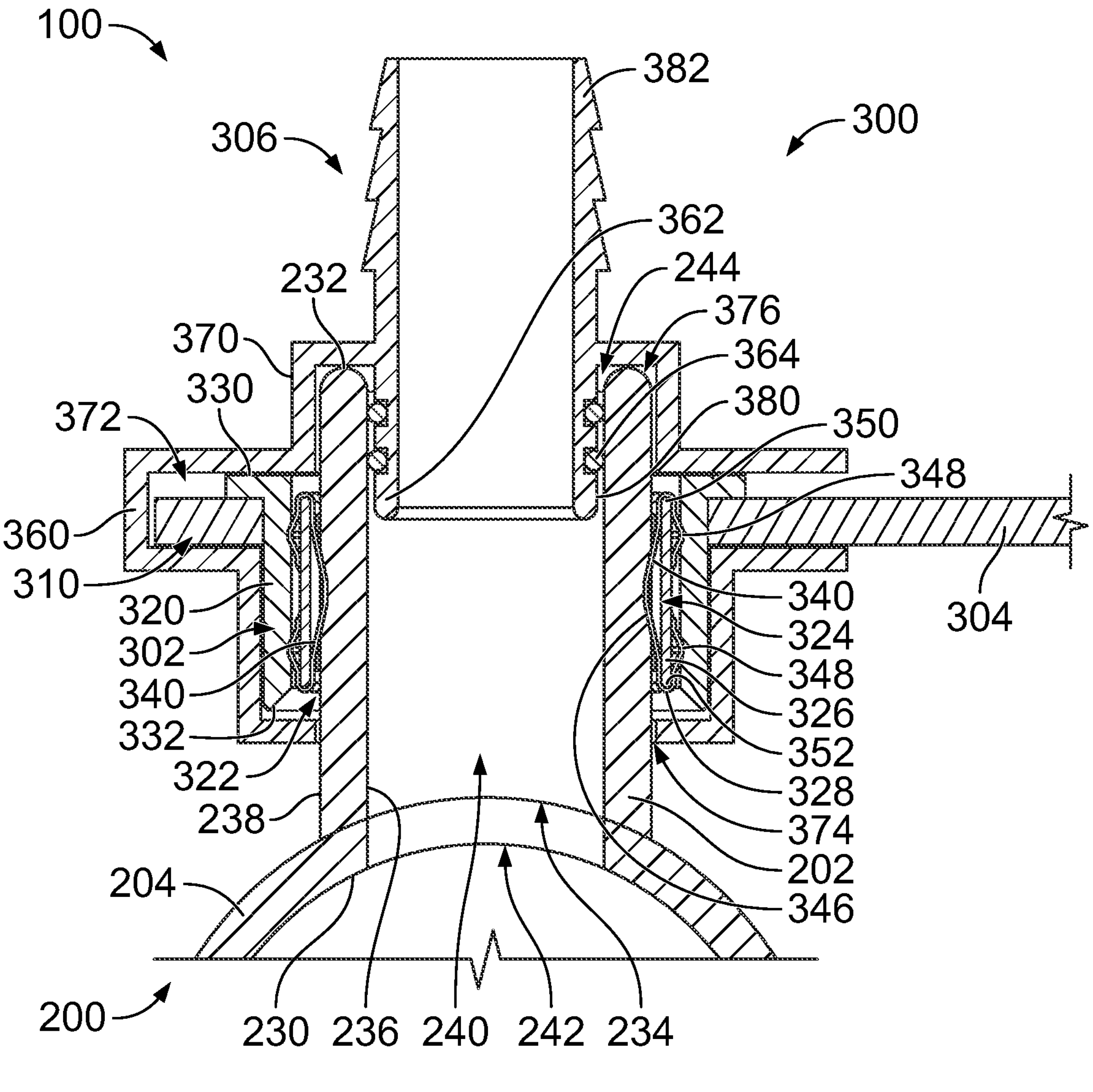
FIG. 4 is a cross-sectional view of a portion of the power connector system in a mated state in accordance with an exemplary embodiment.
Figure 5:
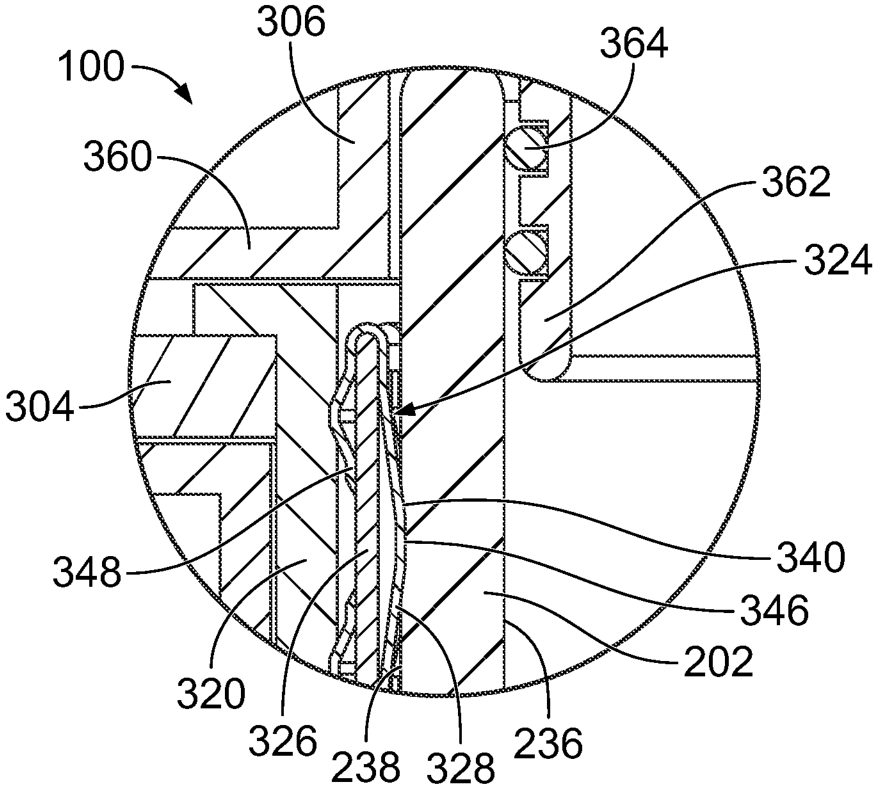
FIG. 5 is an enlarged cross-sectional view of a portion of the power connector system in a mated state in accordance with an exemplary embodiment.

FIG. 2 is a cross-sectional view of a portion of the power connector system 100 in an unmated state. FIG. 3 is a sectional view of a portion of the power connector system 100 in a mated state. FIG. 4 is a cross-sectional view of a portion of the power connector system 100 in a mated state. FIG. 5 is an enlarged cross-sectional view of a portion of the power connector system 100 in a mated state.

The pin terminal 202 is configured to be mated with the socket terminal 302 to electrically connect the first busbar element 204 and the second busbar element 304. In an exemplary embodiment, when the first busbar assembly 200 is mated with the second busbar assembly 300, a fluid coupling is made between the first busbar assembly 200 and the second busbar assembly 300 to allow fluid flow through the power connector system 100 between the first busbar assembly 200 and the second busbar assembly 300. The fluid flow is used to cool the pin terminal 202 and the socket terminal 302 at the mating interface. The cooling system 110 lower the operating temperature of the pin terminal 202 and the socket terminal 302 to allow higher electrical current transferred between the first and second busbar assemblies 200, 300 and/or to reduce the risk of damage to the pin terminal 202 and/or the socket terminal 302.

The first busbar element 204 is manufactured from a conductive material, such as a metal material. In various embodiments, the first busbar element 204 is manufactured from copper or a copper alloy. In the illustrated embodiment, the first busbar element 204 is tube-shaped. For example, the first busbar element 204 may be cylindrical. The first busbar element 204 forms a fluid supply tube 220 for the cooling fluid. The cooling fluid is transported through the fluid supply tube 220. The fluid supply tube 220 supplies cooling fluid to the pin terminal 202. The first busbar element 204 may have other shapes in alternative embodiments. For example, the first busbar element 204 may form a square or rectangular fluid supply tube. In other various embodiments, the first busbar element 204 may be generally planar, such as being a metal plate. In such embodiments, the fluid supply tube may be separate and discrete from the first busbar element 204, but may be coupled to the first busbar element 204 and/or the pin terminal 202.

The pin terminal 202 extends from the first busbar element 204. In various embodiments, the pin terminal 202 is integral with the first busbar element 204, such as being extruded with the first busbar element 204. However, in alternative embodiments, the pin terminal 202 may be separate and discrete from the first busbar element 204 and coupled to the first busbar element 204. For example, the pin terminal 202 may be separately manufactured and loaded into an opening in the first busbar element 204. In such embodiments, the pin terminal 202 may be press-fit into the opening and/or welded to the first busbar element 204. When separately manufactured, the pin terminal 202 may be manufactured from a different material than the first busbar element 204.

The pin terminal 202 extends between an inner end 230 and an outer end 232. The inner end 230 is provided at the first busbar element 204. The outer end 232 is located remote from the first busbar element 204. The outer end 232 defines a mating end of the pin terminal 202. The outer end 232 is configured to be plugged into the socket terminal 302. The pin terminal 202 includes an inner bore 234 extending at least partially through the pin terminal 202. In the illustrated embodiment, the inner bore 234 extends entirely through the pin terminal 202 and is open at the inner end 230 and the outer end 232. The inner bore 234 allows cooling fluid to flow into the pin terminal 202. The pin terminal 202 includes an interior surface 236 and an exterior surface 238. The interior surface 236 defines the inner bore 234. The exterior surface 238 defines a separable mating interface of the pin terminal 202. The exterior surface 238 is configured to be electrically connected to the socket terminal 302.

In an exemplary embodiment, the pin terminal 202 includes at least one cooling channel 240 within the inner bore 234. The cooling channel 240 receives cooling fluid from the fluid supply tube 220. In the illustrated embodiment, the cooling channel 240 is open at the inner end 230 and the outer end 232 to allow the cooling fluid to flow through the pin terminal 202. However, the cooling channel 240 may be closed at the inner end 230 and/or the outer end 232 to allow the cooling fluid to flow into and out of the same end 234 232. The cooling channel 240 includes an inlet port 242 and an outlet port 244. The cooling fluid flows through the cooling channel 240 from the inlet port 242 to the outlet port 244. In the illustrated embodiment, the inlet port 242 is located at the inner end 230 and the outlet port 244 is located at the outer end 232. The inlet port 242 is in fluid communication with the fluid supply tube 220. For example, the inlet port 242 is located at an opening between the first busbar element 204 and the pin terminal 202 to allow fluid flow from the fluid supply tube 220 into the cooling channel 240. The fluid is allowed to exit the first busbar assembly 200 into the second busbar assembly 300 through the outlet port 244. However, in alternative embodiments, the flow may be reversed, such as flowing from the second busbar assembly 300 into the first busbar assembly 200. In such embodiments, the inlet port 242 is provided at the outer end 232 and the outlet port 244 is provided at the inner end 230. In other alternative embodiments, the inner bore 234 may be closed at the outer end 232. Both the inlet port 242 and the outlet port 244 may be provided at the inner end 230. In other various embodiments, rather than having the inlet port 242 at the outlet port 244 at the ends 230, 232, the inlet port 242 and/or the outlet port 244 may be provided in the side of the pin terminal 202.

The second busbar assembly 300 includes the second busbar element 304, the socket terminal 302 and a fluid manifold 306 coupled to at least one of the socket terminal 302 and the second busbar element 304. The fluid manifold 306 allows fluid flow through the second busbar assembly 300. The fluid manifold 306 is configured to be fluidly coupled to the first busbar assembly 200, such as to the cooling channel 240 of the pin terminal 202.

The second busbar element 304 is manufactured from a conductive material, such as a metal material. In various embodiments, the second busbar element 304 is manufactured from copper or a copper alloy. In the illustrated embodiment, the second busbar element 304 is a metal plate. The second busbar element 304 may be planar. In various embodiments, the second busbar element 304 is stamped from a metal sheet. The second busbar element 304 may have other shapes in alternative embodiments.

The socket terminal 302 includes a terminal body 320 having a socket opening 322 therethrough. The socket terminal 302 includes a contact spring module 324 received in the socket opening 322 and electrically connected to the terminal body 320. The contact spring module 324 is configured to be electrically connected to the pin terminal 202 when the pin terminal 202 is plugged into the socket opening 322. The contact spring module 324 forms a separable mating interface with the pin terminal 202. In an exemplary embodiment, the contact spring module 324 includes a support tube 326 and a spring ring 328 wrapped around the support tube 326. The spring ring 328 is compressible during mating with the pin terminal 202. The spring ring 328 forms a reliable electrical connection with the pin terminal 202. The spring ring 328 includes multiple points of contact with the pin terminal 202 and multiple points of contact with the terminal body 320 to create a conductive path between the pin terminal 202 and the socket terminal 302.

The socket terminal 302 extends from the second busbar element 304. In various embodiments, the terminal body 320 of the socket terminal 302 is integral with the second busbar element 304, such as being extruded with the second busbar element 304. However, in alternative embodiments, the terminal body 320 of the socket terminal 302 may be separate and discrete from the second busbar element 304 and coupled to the second busbar element 304. For example, the terminal body 320 of the socket terminal 302 may be separately manufactured and loaded into an opening in the second busbar element 304. In such embodiments, the terminal body 320 of the socket terminal 302 may be press-fit into the opening and/or welded to the second busbar element 304. When separately manufactured, the terminal body 320 of the socket terminal 302 may be manufactured from a different material than the second busbar element 304.

The socket terminal 302 extends between an inner end 330 and an outer end 332. The inner end 330 is provided at the second busbar element 304. The outer end 332 is located remote from the second busbar element 304. The second busbar assembly 300 may be oriented such that the inner end 330 is located at a top of the socket terminal 302 and the outer end 332 is located at a bottom of the socket terminal 302. Other orientations are possible in alternative embodiments. The socket terminal 302 is configured to receive the pin terminal 202 through the outer end 332. The socket opening 322 extends entirely through the socket terminal 302 and is open at the inner end 330 and the outer end 332.

In an exemplary embodiment, the spring ring 328 is stamped and formed in wrapped into a ring-shaped. The spring ring 328 includes a plurality of spring elements 340. In an exemplary embodiment, the spring elements 340 are connected together by connecting elements forming a first band 342 at the top of the spring ring 328 and a second band 344 at the bottom of the spring ring 328. The spring elements 340 are arch shaped or V-shaped between the bands 342, 344. The spring elements 340 are flexed inward between the bands 342, 344 such that the spring ring 328 has an hourglass shape being narrower in the middle and wider at the bands 342, 344. The spring elements 340 have mating interfaces 346 in the middle between the bands 342, 344 to interface with the pin terminal 202. In an exemplary embodiment, when the spring ring 328 is formed in the ring-shaped, the spring elements 340 form torsional springs configured to interface with the pin terminal 202. The spring elements 340 may be flexed outward when the pin terminal 202 is plugged into the socket opening 322 to create a reliable mechanical and electrical connection between the spring ring 328 and the pin terminal 202.

In an exemplary embodiment, upper and lower ends of the spring elements 340 are wrapped around the support tube 326 to form outer spring elements 348. For example, the outer spring elements 348 are wrapped around a first end 350 and a second end 352 of the support tube 326. The outer spring elements 348 are shaped to interface with the terminal body 320 when the spring ring 328 is received in the socket opening 322. The outer spring elements 348 are deflectable to create a reliable electrical connection between the spring ring 328 and the terminal body 320.

Other types of socket terminals may be used in alternative embodiments to create an electrical connection between the pin terminal 202 and the second busbar element 304.

The fluid manifold 306 is coupled to the first mating portion 310 of the second busbar element 304. The fluid manifold 306 surrounds the socket terminal 302. The fluid manifold 306 is configured to be coupled in flow communication with the cooling channel 240 of the pin terminal 202 2 allow fluid flow through the second busbar assembly 300. In an exemplary embodiment, the fluid manifold 306 includes an outer shell 360, an inner hub 362, and interface seal 364, and a fluid line 366 (FIG. 2).

The outer shell 360 has one or more walls 370 forming a cavity 372. The first mating portion 310 of the second busbar element 304 extends into the cavity 372. The socket terminal 302 is located within the cavity 372. Optionally, the outer shell 360 may completely surround the socket terminal 302. The outer shell 360 includes a shell opening 374 aligned with the socket opening 322. The shell opening 374 receives the pin terminal 202 and allows the pin terminal 202 2 plugged into the socket terminal 302. In the illustrated embodiment, the shell opening 374 is provided at the bottom of the outer shell 360. Other locations and orientations are possible in alternative embodiments. In an exemplary embodiment, the outer shell 360 includes a pocket 376 opposite the shell opening 374. For example, the pocket 376 may be located at a top of the outer shell 360. The pocket 376 is configured to receive the distal end of the pin terminal 202 when the pin terminal 202 is plugged into the second busbar assembly 300. The pocket 376 may be located above the socket terminal 302 to receive a portion of the pin terminal 202 that passes completely through the socket terminal 302.

The inner hub 362 extends into the cavity 372 to interface with the pin terminal 202 when the pin terminal 202 is plugged into the second busbar assembly 300. For example, the inner hub 362 may extend into the pocket 376 2 interface with the mating end of the pin terminal 202. In an exemplary embodiment, the inner hub 362 is cylindrical. However, the inner hub 362 may have other shapes in alternative embodiments. The inner hub 362 includes a hub interface 380 configured to be coupled to the pin terminal 202. In an exemplary embodiment, the interface seal 364 is coupled to the hub interface 380. For example, the interface seal 364 extends around the outer surface of the hub interface 380. The interface seal 364 is configured to seal to the interior surface 236 of the pin terminal 202 to create a fluid tight seal between the pin terminal 202 and the inner hub 362. In an exemplary embodiment, a portion of the inner hub 362 extends to the exterior of the outer shell 360. For example, the inner hub 362 includes a connection tube 382. The fluid line 366 is coupled to the connection tube 382. Optionally, the connection tube 382 may include barbs or other features to mechanically secure the fluid line 366 to the connection tube 382. Optionally, the fluid line 366 may be a plastic tube configured to be plugged onto the connection tube 382. The fluid line 366 receives the cooling fluid from the pin terminal 202 via the inner hub 362.

When the first and second busbar assemblies 200, 300 are mated, the fluid coupling is made to allow fluid flow through the power connector system 100 between the first busbar assembly 200 and the second busbar assembly 300. The fluid flow is used to cool the pin terminal 202 and the socket terminal 302 at the mating interface. For example, the cooling flow is located immediately behind the mating interface to provide cooling close to the source of heating. The cooling system 110 lower the operating temperature of the pin terminal 202 and the socket terminal 302 to allow higher electrical current transferred between the first and second busbar assemblies 200, 300 and/or to reduce the risk of damage to the pin terminal 202 and/or the socket terminal 302. For example, by cooling the body of the pin terminal directly at the mating interface, the operating temperature of the spring elements 340 may be lowered, reducing the risk of failure of the spring elements from overheating. The cooling of the pin terminal and the socket terminal, such as at the spring elements 340, allows operation at higher currents and/or for longer operating times. For example, fast charging of the battery through the power connector system 100 may occur at higher currents or for longer duration due to the lower operating temperatures provided by the cooling system.

Figure 6:
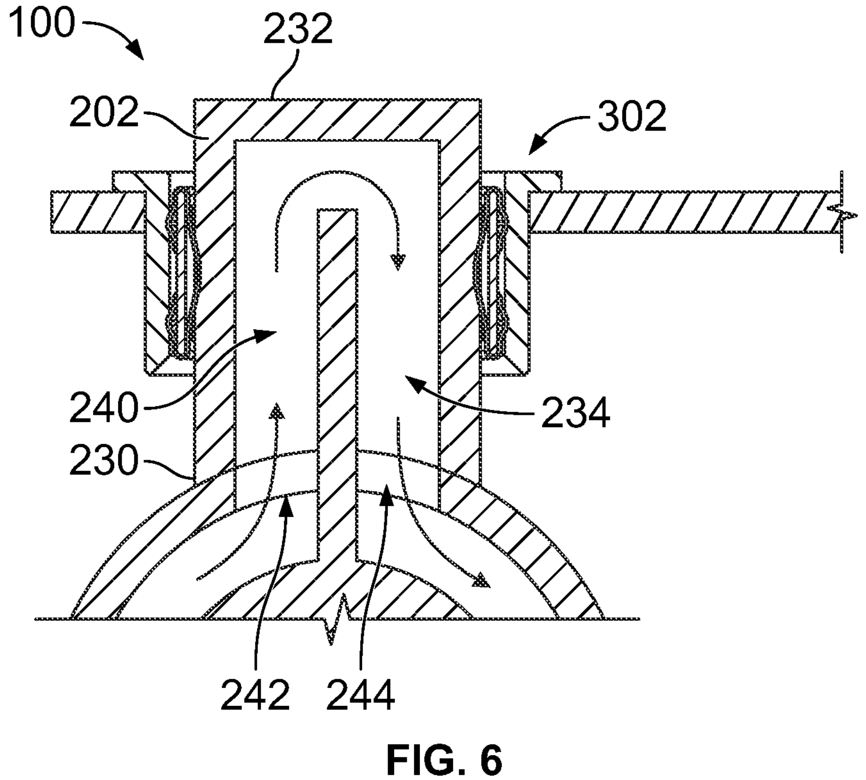
FIG. 6 is a cross-sectional view of a portion of the power connector system in a mated state in accordance with an exemplary embodiment.

FIG. 6 is a cross-sectional view of a portion of the power connector system 100 in a mated state. FIG. 6 illustrates an embodiment wherein the supply and the return for the cooling fluid both occur through the inner end 230 of the pin terminal 202. The inner bore 234 of the pin terminal 202 is closed. For example, the outer end 232 is closed. The inlet port 242 for the cooling channel 240 is at the inner end 230 and the outlet port 244 for the cooling channel 240 is also at the inner end 230. The cooling channel 240 in the pin terminal extends to locations near the mating interface to cool the mating interface of the pin terminal 202, and thus provide cooling for the socket terminal 302 to lower the operating temperatures of both the pin terminal 202 and the socket terminal 302.

Figure 7:
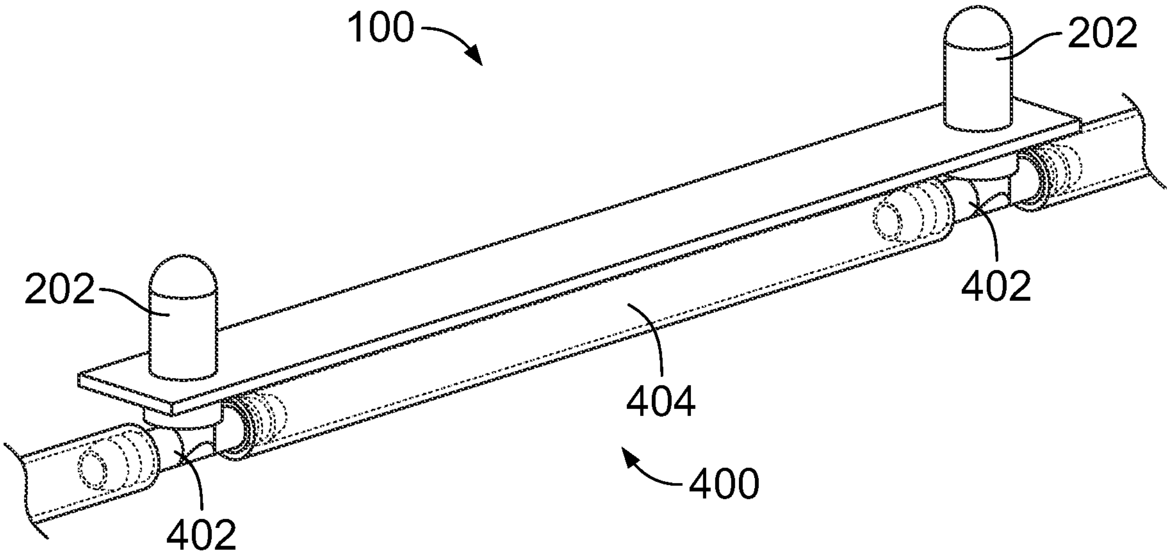
FIG. 7 illustrates a portion of the power connector system in accordance with an exemplary embodiment using closed pins for cooling.

FIG. 7 illustrates a portion of the power connector system 100 in accordance with an exemplary embodiment using closed pins for cooling. The closed pin terminals 202 are shown at both ends of the busbar element 204. A fluid manifold 400 supplies cooling fluid to the pin terminals 202. The fluid manifold 400 includes cooling inserts 402 attached to the pin terminals 202. Cooling channels 404 are connected to the cooling inserts 402 to allow cooling flow to/from the cooling inserts 402. The cooling channels 404 may be pipes or tubes. The cooling fluid flows into the pin terminals 202 to lower the operating temperatures of the pin terminals 202, and thus any socket terminals connected to the pin terminals 202.

Figure 8:
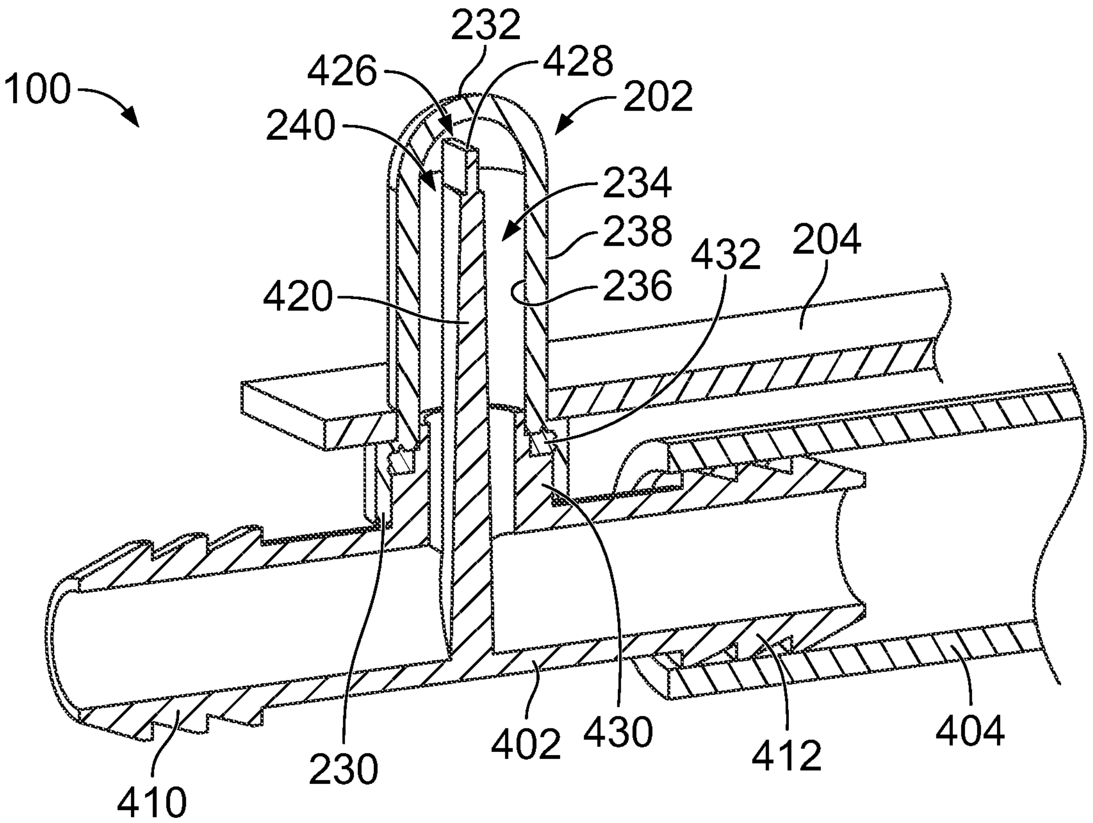
FIG. 8 is a cross sectional view of a portion of the power connector system in accordance with an exemplary embodiment showing the closed pin terminal connected to the busbar element.
Figure 9:
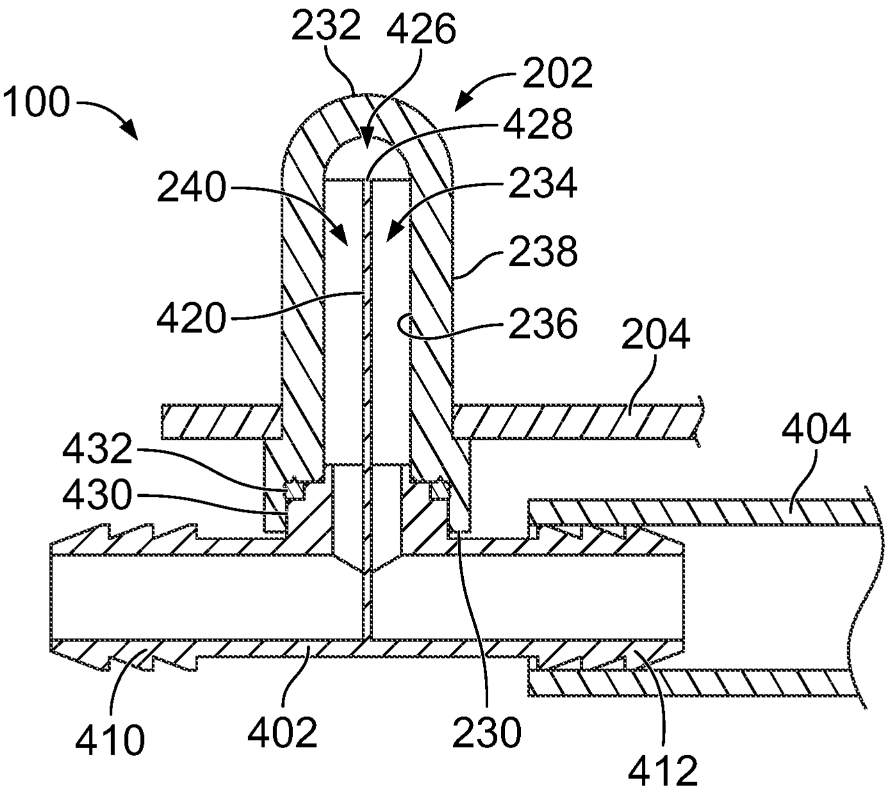
FIG. 9 is a cross sectional view of the pin terminal in accordance with an exemplary embodiment.
Figure 10:
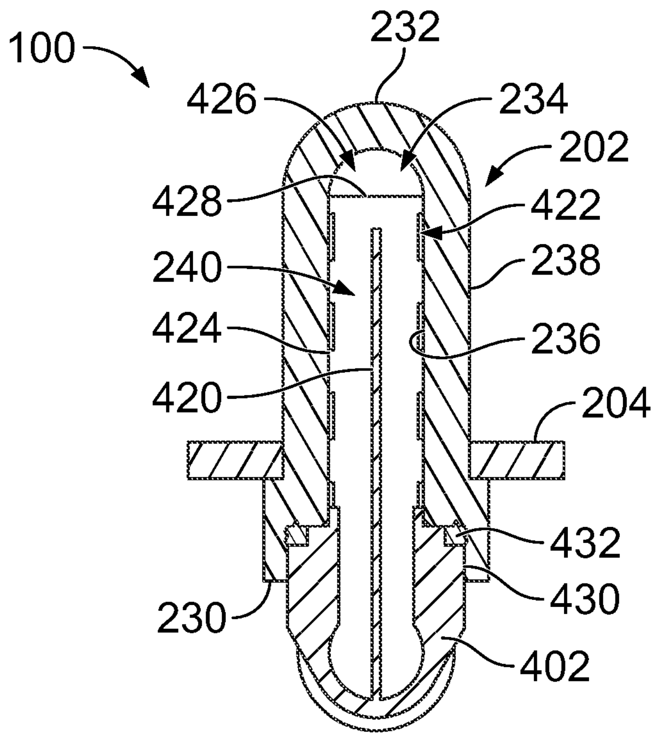
FIG. 10 is a cross sectional view of the pin terminal in accordance with an exemplary embodiment.

FIG. 8 is a cross sectional view of a portion of the power connector system 100 in accordance with an exemplary embodiment showing the closed pin terminal 202 connected to the busbar element 204. FIG. 9 is a cross sectional view of the pin terminal 202 in accordance with an exemplary embodiment. FIG. 10 is a cross sectional view of the pin terminal 202 in accordance with an exemplary embodiment.

The first busbar element 204 is manufactured from a conductive material, such as a metal material. In various embodiments, the first busbar element 204 is manufactured from copper or a copper alloy. In the illustrated embodiment, the first busbar element 204 is flat, such as being a metal plate. The supply tube for the cooling fluid is supplied by the cooling tube 404, which is separate from the first busbar element 204 in the illustrated embodiment. The cooling tube 404 may be coupled to the first busbar element 204 in various embodiments. The cooling fluid is transported through the cooling tube 404 to the cooling insert 402, which supplies cooling fluid to the pin terminal 202.

The pin terminal 202 extends from the first busbar element 204. In various embodiments, the pin terminal 202 is separate and discrete from the first busbar element 204 and coupled to the first busbar element 204. For example, the pin terminal 202 may be separately manufactured and loaded into an opening in the first busbar element 204. In such embodiments, the pin terminal 202 may be press-fit into the opening and/or welded to the first busbar element 204. The pin terminal 202 may be manufactured from a different material than the first busbar element 204.

The pin terminal 202 extends between the inner end 230 and the outer end 232. The inner end 230 is provided at the first busbar element 204. The outer end 232 is located remote from the first busbar element 204 and is configured to be plugged into a socket terminal. The outer end 232 defines a mating end of the pin terminal 202. The pin terminal 202 includes an inner bore 234 extending at least partially through the pin terminal 202. In the illustrated embodiment, the inner bore 234 is open at the inner end 230 and closed at the outer end 232. The cooling insert 402 is received in the inner bore 234 to control fluid flow through the pin terminal 202, such as through the cooling channel 240 directly along the interior surface 236 to cool the pin terminal 202. The exterior surface 238 defines a separable mating interface of the pin terminal 202. The exterior surface 238 is configured to be electrically connected to the socket terminal.

The cooling insert 402 includes a first port 410 and a second port 412. The cooling tubes 404 are connected to the ports 410, 412, such as to supply or return the cooling fluid to a remote location. The cooling insert 402 includes a wall 420 between the ports 410, 412. The wall 420 is received in the inner bore 234 to form the cooling channels 240. For example, the wall 420 may be approximately centered in the pin terminal 202 to form an inlet cooling channel and an outlet cooling channel for fluid flow through the pin terminal 202. The wall 420 may engage the interior surface 236 to position the cooling insert 402 in the inner bore 234. In an exemplary embodiment, the wall 420 includes slots 422 (FIG. 10) at outer edges 424 of the wall 420. The slots 422 allow cooling fluid flow between the cooling channels 240, which encourages cooling fluid flow along the interior surface 236 of the pin terminal 202 to promote cooling of the pin terminal 202. A gap 426 is provided above a distal end 428 of the wall and the outer end 232 of the pin terminal 202. The gap 426 is sized to encourage cooling flow along the length of the pin terminal 202. For example, the gap 426 is sufficiently large such that a significant portion of the fluid flows through the gap 426 rather than through the slots 422, which encourages cooling flow along the entire pin terminal 202. The cooling insert 402 includes a connecting hub 430 plugged into the inner end 230 of the pin terminal 202. A seal 432 is provided at the connecting hub 430 to seal the connection between the connecting hub 430 and the pin terminal 202. The cooling hub 430 may be secured to the pin terminal 202 using adhesive or other securing means, such as latches, clips, fasteners, and the like.

Figure 11:
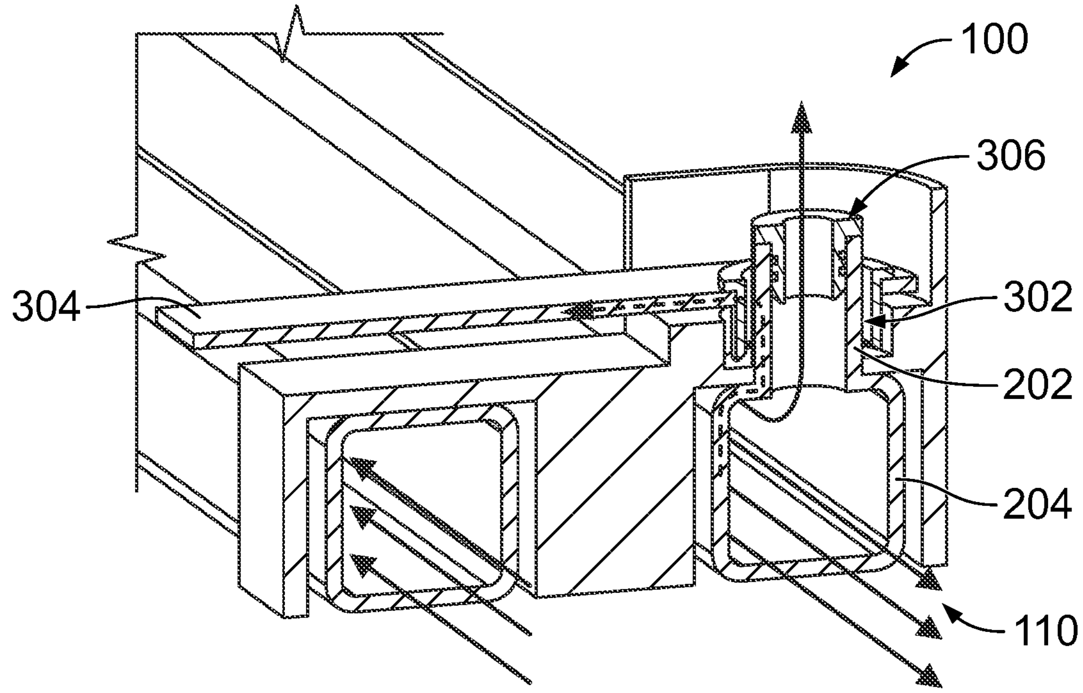
FIG. 11 is a sectional view of a portion of the power connector system in a mated state.

FIG. 11 is a sectional view of a portion of the power connector system 100 in a mated state. FIG. 11 shows the cooling system 110 in accordance with an exemplary embodiment. In the illustrated embodiment, the first busbar element 204, which incorporates the pin terminal 202, is used to define both the fluid flow path and the electrical path for the power connector system 100. The first busbar element 204 distributes both the fluid and the electrical supply for the pin terminal 202. The power is supplied to the second busbar element 304 through the socket terminal 302. The fluid is supplied to the fluid manifold 306.

Figure 12:
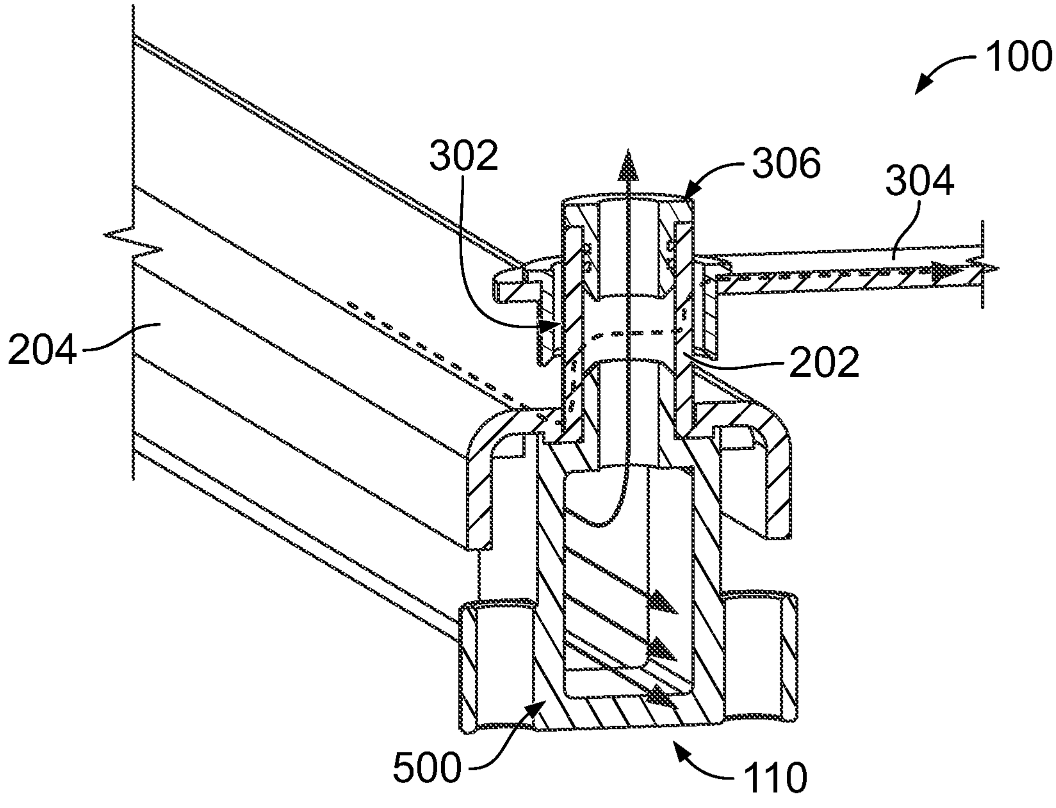
FIG. 12 is a sectional view of a portion of the power connector system in a mated state.

FIG. 12 is a sectional view of a portion of the power connector system 100 in a mated state. FIG. 12 shows the cooling system 110 in accordance with an exemplary embodiment. In the illustrated embodiment, the first busbar element 204, which incorporates the pin terminal 202, defines the electrical path for the power connector system 100. However, the fluid flow path is defined by a separate fluid manifold 500, which is connected to the fluid manifold 306 through the pin terminal 202. The first busbar element 204 only distributes the electrical supply, but not the fluid supply, for the pin terminal 202. The power is supplied to the second busbar element 304 through the socket terminal 302. The fluid is supplied to the fluid manifold 306 through the pin terminal 202, which is used to cool the pin terminal 202 and the socket terminal 302.

Figure 13:
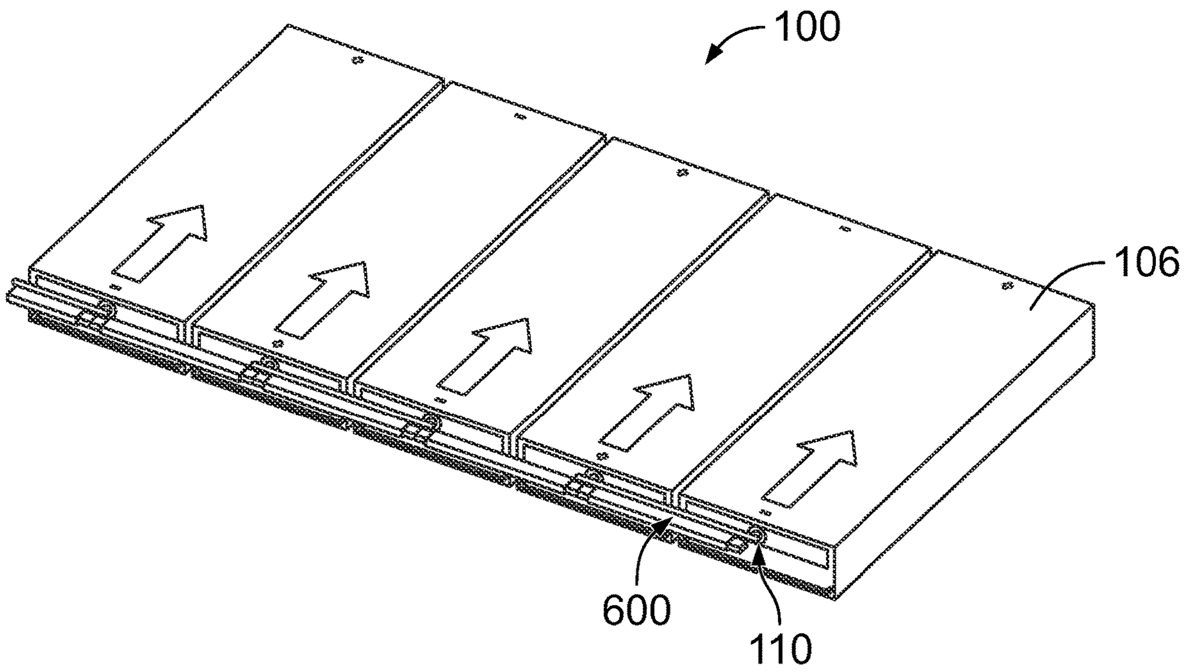
FIG. 13 illustrates the power connector system showing the cooling system in accordance with an exemplary embodiment.

FIG. 13 illustrates the power connector system 100 showing the cooling system 110 in accordance with an exemplary embodiment. A series of components 106, such as batteries, are shown. The components 106 are electrically connected in series using busbar elements connected using pin terminals 202 and socket terminals 302. The cooling system 110 provides cooling in parallel using a cooling manifold 600. For example, the cooling manifold 600 is connected to each of the components 106, in parallel.

Figure 14:
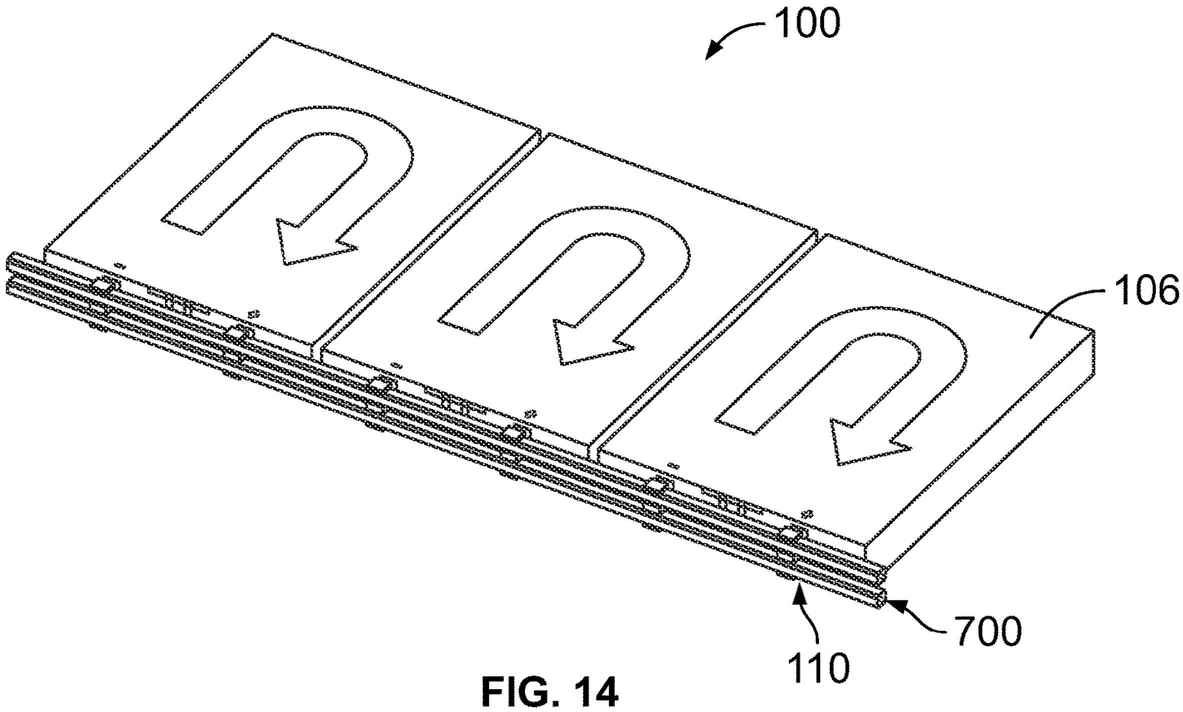
FIG. 14 illustrates the power connector system showing the cooling system in accordance with an exemplary embodiment.

FIG. 14 illustrates the power connector system 100 showing the cooling system 110 in accordance with an exemplary embodiment. A series of components 106, such as batteries, are shown. The components 106 are electrically connected in parallel using busbar elements connected using pin terminals 202 and socket terminals 302. The cooling system 110 provides cooling in parallel using a cooling manifold 700. For example, the cooling manifold 700 is connected to each of the components 106, in parallel.

Figure 15:
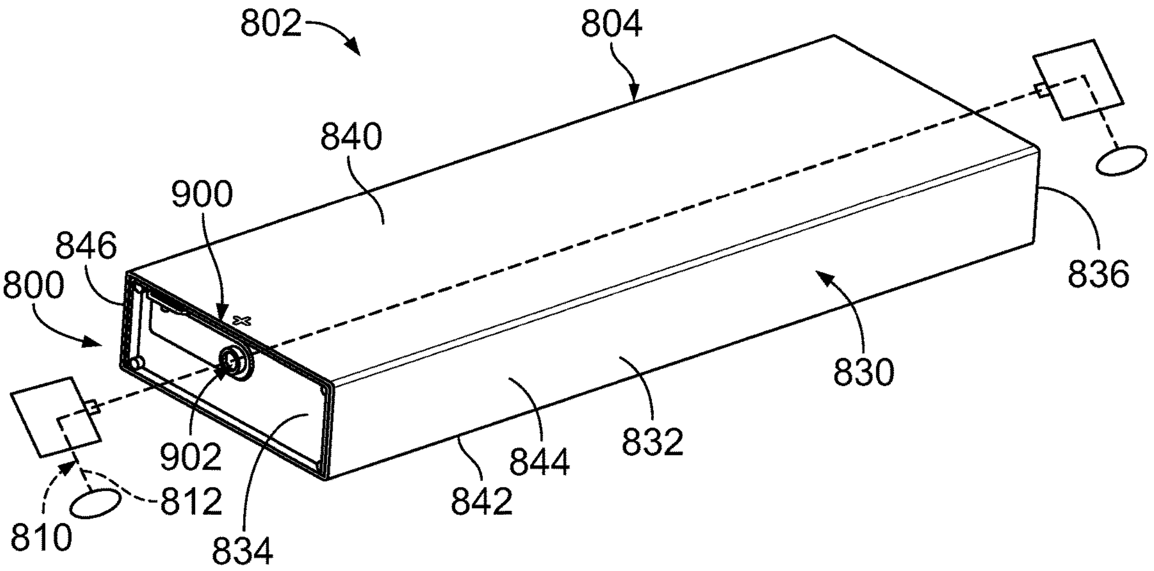
FIG. 15 illustrates a power connector system for an electrical component in accordance with an exemplary embodiment.
Figure 16:
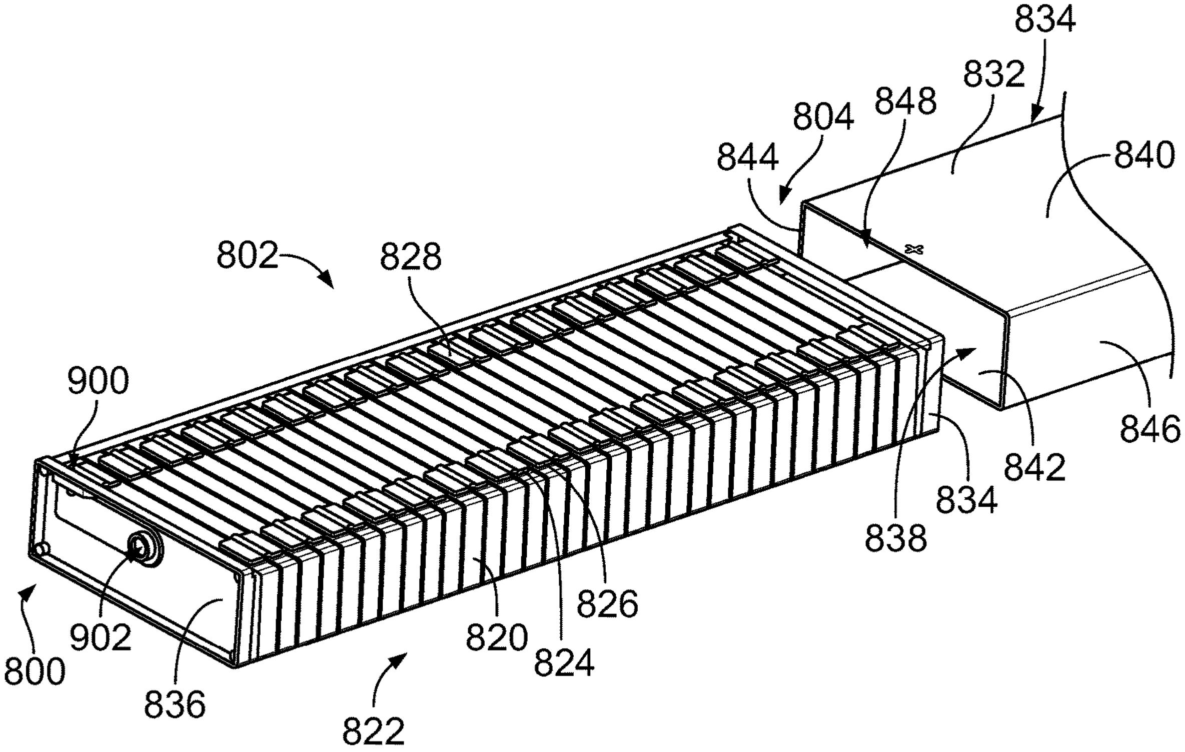
FIG. 16 is an exploded view of the electrical component in accordance with an exemplary embodiment.

FIG. 15 illustrates a power connector system 800 for an electrical component 802 in accordance with an exemplary embodiment. FIG. 16 is an exploded view of the electrical component 802 in accordance with an exemplary embodiment. In the illustrated embodiment, the electrical component 802 is a battery module 804, such as a battery module for an electric vehicle. The power connector system 800 includes a busbar assembly 900 having a battery terminal 902 forming an electrical interface for the battery module 804. In an exemplary embodiment, the power connector system 800 includes busbar assemblies 900 and battery terminals 902 at both ends of the battery module 804, or may include multiple busbar assemblies 900 and battery terminals 902 at the same end of the battery module 804, such as for main positive and negative battery connections for the battery module 804. The battery terminal 902 is configured to be coupled to a mating power element to electrically connect the battery module 804 to another electrical component, such as at a separable mating interface. The busbar assembly 900 may be the busbar assembly 200 (shown in FIG. 1) or the busbar assembly 300 (shown in FIG. 1). The battery terminal 902 may be the pin terminal 202 (shown in FIG. 1) or the socket terminal 302 (shown in FIG. 1) in various embodiments.

The power connector system 800 includes a cooling system 810 supplying cooling fluid flow to the battery module 804. In an exemplary embodiment, the cooling fluid flow is supplied to the battery terminal 902 and flows through the battery terminal 902. The cooling system 810 includes one or more cooling fluid lines 812, which may be supply lines or return lines. The cooling system 810 may be a closed loop system. The supply and return lines may be tubes, pipes, manifolds, or other structures to contain and direct the flow of the cooling fluid through the system. In various embodiments, the cooling fluid may be liquid coolant circulated through the system. In other various embodiments, the cooling fluid may be airflow circulated through the system or passing through the power connector system 800 into the external environment.

In various embodiments, the power connector system 800 is used in a vehicle, such as an electric vehicle or a hybrid electric vehicle. However, the power connector system 800 may be used in other systems, such as an industrial system, a communication system, a network system, a building, and the like. In an exemplary embodiment, the electrical component 802 is a battery, which may be connected to a load, such as a motor, that receives power from the battery or may be connected to a charging inlet for charging the battery.

In an exemplary embodiment, the battery module 804 is a stacked cell battery module. The battery module 804 includes a plurality of battery cells 820 (FIG. 25) arranged in a stack 822. Optionally, multiple battery modules 804 may be stacked or ganged together to form a battery pack. Each battery cell 820 includes a positive terminal 824 and a negative terminal 826. The terminals of the battery cells 822 are connected together by cell busbars 828. In various embodiments, the cell busbars 828 are welded to the corresponding positive terminals 824 and negative terminals 826. In the illustrated embodiment, the terminals 824, 826 and the cell busbars 828 are arranged on the top of the stack 822. However, the terminals 824, 826 and the cell busbars 828 may additionally or alternatively be arranged on the bottom of the stack 822. The busbar assembly 900 and the battery terminals 902 are electrically connected to the battery cells 822. For example, the busbar assembly 900 may be directly connected to the corresponding positive terminal 824 or negative terminal 826 of the end battery cell 822, such as by welding. In other embodiments, the busbar assembly 900 may be connected to the corresponding terminals 824, 826 by the cell busbars 828.

In an exemplary embodiment, the battery module 804 includes a battery case 830 that holds the battery cells 820. The battery case 830 includes an outer shell 832 and end plates 834, 836 coupled to ends of the outer shell 832. The outer shell 832 forms a cavity 838 that receives the stack 822 of the battery cells 820. In the illustrated embodiment, the outer shell 832 is rectangular having a top 840, a bottom 842, a first side 844, and a second side 846. Openings 848 are provided at the opposite ends of the outer shell 832. The end plates 834, 836 are received in the openings 848 to close the openings 848. In an exemplary embodiment, the end plates 834, 836 are sealed to the outer shell 832 to provide an enclosed structure.

In an exemplary embodiment, the cavity 838 is fluid tight to allow liquid cooling of the battery cells 822 in the cavity. In an exemplary embodiment, liquid cooling flows into the battery module 804 through the battery terminals 902. For example, the battery terminals 902 form both the positive and negative electrical connections as well as the inlet and outlet ports for the cooling fluid flow. Each battery terminal 902 forms one of a) fluid inlet and a positive battery terminal, b) a fluid inlet and a negative battery terminal, c) a fluid outlet and a positive battery terminal, or d) fluid outlet and a negative battery terminal. The liquid cooling reduces operating temperatures of the various components of the battery module 804 to reduce charging time and/or increase vehicle performance. The liquid cooling reduces the risk of thermal runaway of the battery module 804. The battery terminal 902 forms a cooled electrical connection that is integrated into the battery case 830. The battery terminal 902 is a single component that is used as both the electrical and thermal delivery system, thereby reducing the number of connections for each battery module 804 from four connections (separate +/− and separate fluid I/O) to two connections (combined + with I/O and − with I/O). In an exemplary embodiment, the battery terminal 902 is in direct contact with the cooling fluid by co-locating the electrical and thermal delivery in the same component. Temperature gradients of the battery terminal 902 are reduced by introducing the cooling flow through the battery terminal 902. Additionally, the temperatures of the terminals 824, 826 and the cell busbars 828 is reduced by allowing coolant flow through the cavity 838.

Figure 17:
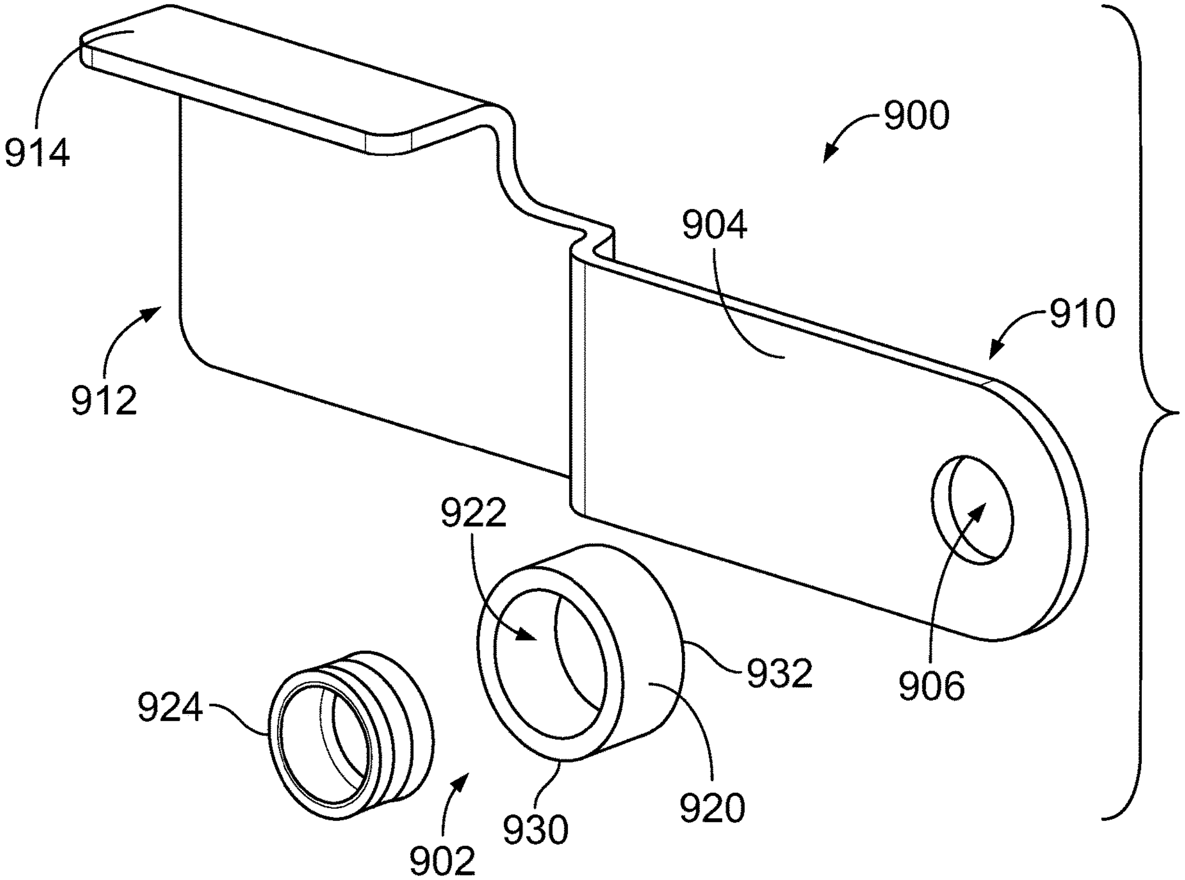
FIG. 17 is an exploded view of the busbar assembly and the battery terminal in accordance with an exemplary embodiment.
Figure 18:
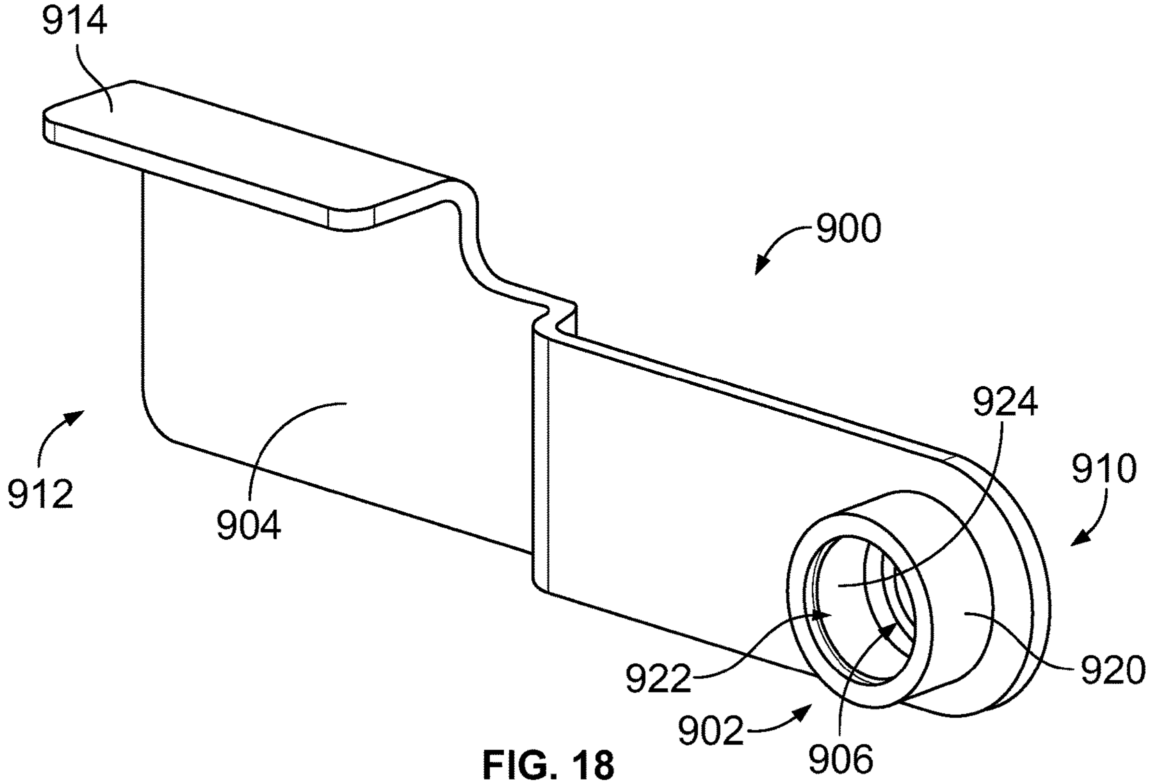
FIG. 18 is an assembled view of the busbar assembly and the battery terminal in accordance with an exemplary embodiment.

FIG. 17 is an exploded view of the busbar assembly 900 and the battery terminal 902 in accordance with an exemplary embodiment. FIG. 18 is an assembled view of the busbar assembly 900 and the battery terminal 902 in accordance with an exemplary embodiment. The busbar assembly 900 includes a busbar element 904, the battery terminal 902 extending from the busbar element 904, and a fluid manifold 906 through the battery terminal 902 and the busbar element 904. The fluid manifold 906 allows fluid flow through the busbar assembly 900. The fluid manifold 906 is configured to be fluidly coupled to the mating element, such as to a cooling channel of a pin terminal (for example, the pin terminal 202).

In the illustrated embodiment, the battery terminal 902 is a separate and discrete component from the busbar element 904 and coupled to the busbar element 904 to form the busbar assembly 900. However, in alternative embodiments, the battery terminal 902 may be integral with the busbar element 904. For example, the battery terminal 902 may be extruded or stamped and formed with the busbar element 904 such that the busbar element 904 in the battery terminal 902 are a monolithic, unitary structure.

In an exemplary embodiment, the busbar element 904 extends between a first mating portion 910 and a second mating portion 912. The first mating portion 910 includes the battery terminal 902 and is configured to be mated to the mating power element (for example, a pin terminal) of the mating connector. The second mating portion 912 is configured to be electrically connected to the battery module 804. In an exemplary embodiment, the busbar element 904 includes a terminal tab 914 at the second mating portion 912. The busbar element 904 is configured to transmit power between the battery terminal 902 and the cell terminal of the battery cell 820. The busbar element 904 may be electrically connected to the cell terminal by a direct connection (for example, weld, bolt, threaded connection, and the like) or by using other conductors, such as a cell busbar 828. For example, the terminal tab 914 may be welded to the cell terminal or the cell busbar 828.

The busbar element 904 is manufactured from a conductive material, such as a metal material. In various embodiments, the busbar element 904 is manufactured from copper or a copper alloy. In the illustrated embodiment, the busbar element 904 is a metal plate. The busbar element 904 may be planar or may include one or more bends or steps. In various embodiments, the busbar element 904 is stamped from a metal sheet. The busbar element 904 may have other shapes in alternative embodiments.

In an exemplary embodiment, the battery terminal 902 is a socket terminal and may be referred to hereinafter as a socket terminal 902. However, in alternative embodiments, the battery terminal 902 may be a pin terminal, such as the pin terminal 202. The socket terminal 902 includes a terminal body 920 having a socket opening 922 therethrough. The socket terminal 902 includes a contact spring module 924 received in the socket opening 922 and electrically connected to the terminal body 920. The contact spring module 924 is configured to be electrically connected to the pin terminal 202 when the pin terminal 202 is plugged into the socket opening 922. The contact spring module 924 forms a separable mating interface with the pin terminal 202. In an exemplary embodiment, the contact spring module 924 includes a spring ring that is compressible during mating with the pin terminal 202 to form a reliable electrical connection with the pin terminal 202.

The socket terminal 902 extends from the busbar element 904. In various embodiments, the terminal body 920 of the socket terminal 902 is integral with the busbar element 904, such as being extruded with the busbar element 904. However, in alternative embodiments, the terminal body 920 of the socket terminal 902 may be separate and discrete from the busbar element 904 and coupled to the busbar element 904. For example, the terminal body 920 of the socket terminal 902 may be separately manufactured and loaded into an opening in the busbar element 904. In such embodiments, the terminal body 920 of the socket terminal 902 may be press-fit into the opening and/or welded to the busbar element 904. When separately manufactured, the terminal body 920 of the socket terminal 902 may be manufactured from a different material than the second busbar element 904.

The socket terminal 902 extends between an inner end 930 and an outer end 932. The inner end 930 is provided at the busbar element 904. The outer end 932 is located remote from the busbar element 904. The busbar assembly 900 may be oriented such that the inner end 930 is located at a rear of the socket terminal 902 and the outer end 932 is located at a front of the socket terminal 902. Other orientations are possible in alternative embodiments. The socket terminal 902 is configured to receive the pin terminal 202 through the outer end 932. The socket opening 922 extends entirely through the socket terminal 902 and is open at the inner end 930 and the outer end 932.

Figure 19:
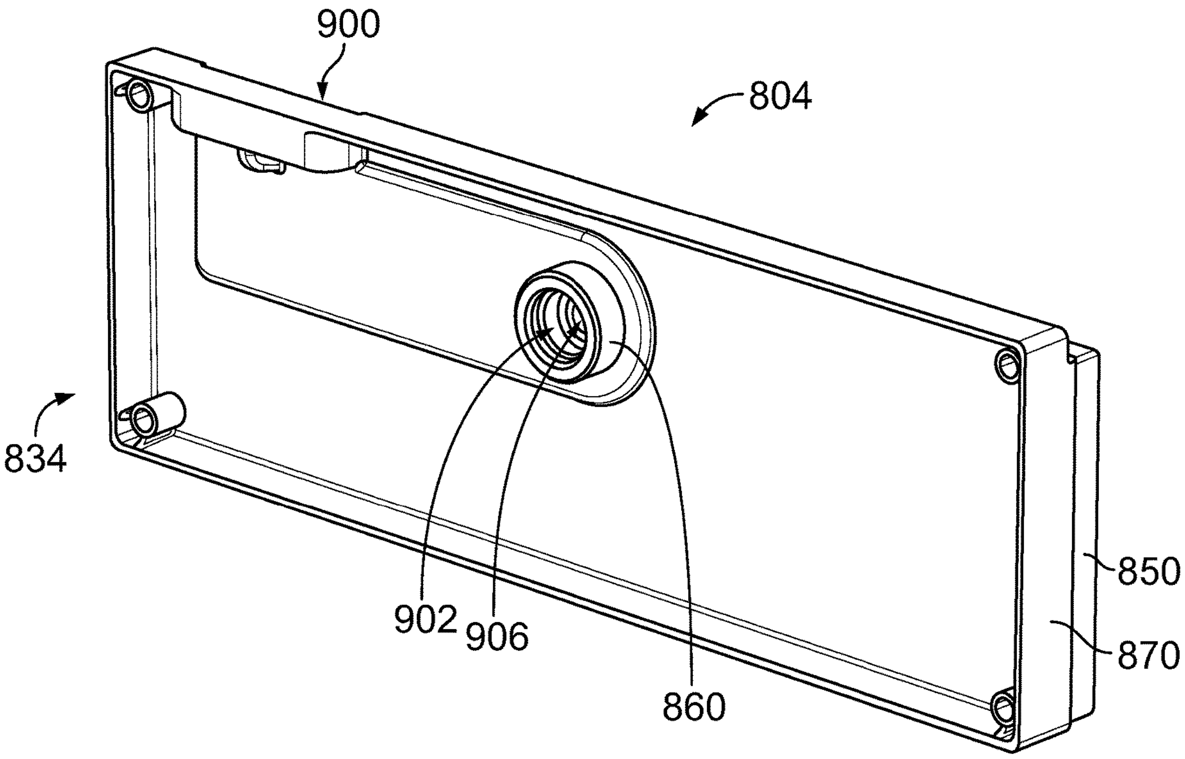
FIG. 19 is a perspective view of a portion of the battery module showing the endplate holding the busbar assembly and the battery terminal in accordance with an exemplary embodiment.
Figure 20:
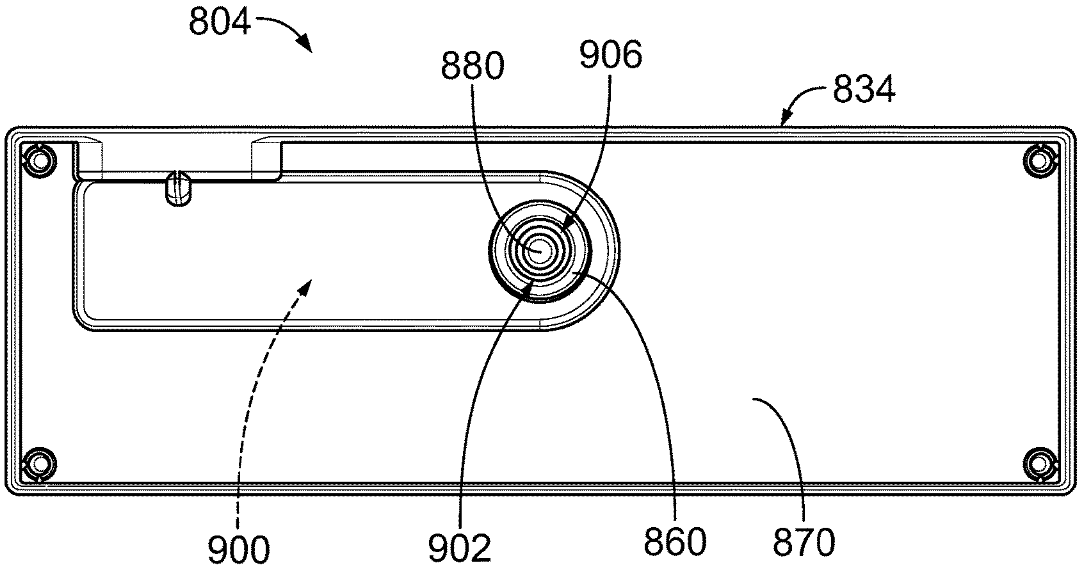
FIG. 20 is an end view of a portion of the battery module showing the endplate holding the busbar assembly and the battery terminal in accordance with an exemplary embodiment.

FIG. 19 is a perspective view of a portion of the battery module 804 showing the endplate 834 holding the busbar assembly 900 and the battery terminal 902 in accordance with an exemplary embodiment. FIG. 20 is an end view of a portion of the battery module 804 showing the endplate 834 holding the busbar assembly 900 and the battery terminal 902 in accordance with an exemplary embodiment.

In an exemplary embodiment, the endplate 834 is a multipiece structure that is assembled together to hold the busbar assembly 900 and the battery terminal 902. In an exemplary embodiment, the endplate 834 includes an inner frame 850, and an outer housing 860, and a cover 870. The busbar assembly 900 is held between the inner frame 850 and the outer housing 860. The battery terminal 902 extends through openings in the outer housing 860 in the cover 870 for mating with the mating power element (for example, the pin terminal 202). The fluid manifold 906 extends through the battery terminal 902 to allow fluid flow between the interior and exterior of the endplate 834. In an exemplary embodiment, a fluid seal 880 is provided at the fluid manifold 906. The fluid seal 880 may be sealed to the battery terminal 902 and/or the mating power element. The fluid seal 880 may be sealed to the endplate 834, such as the inner frame 850 and/or the outer housing 860 and/or the cover 870.

Figure 21:
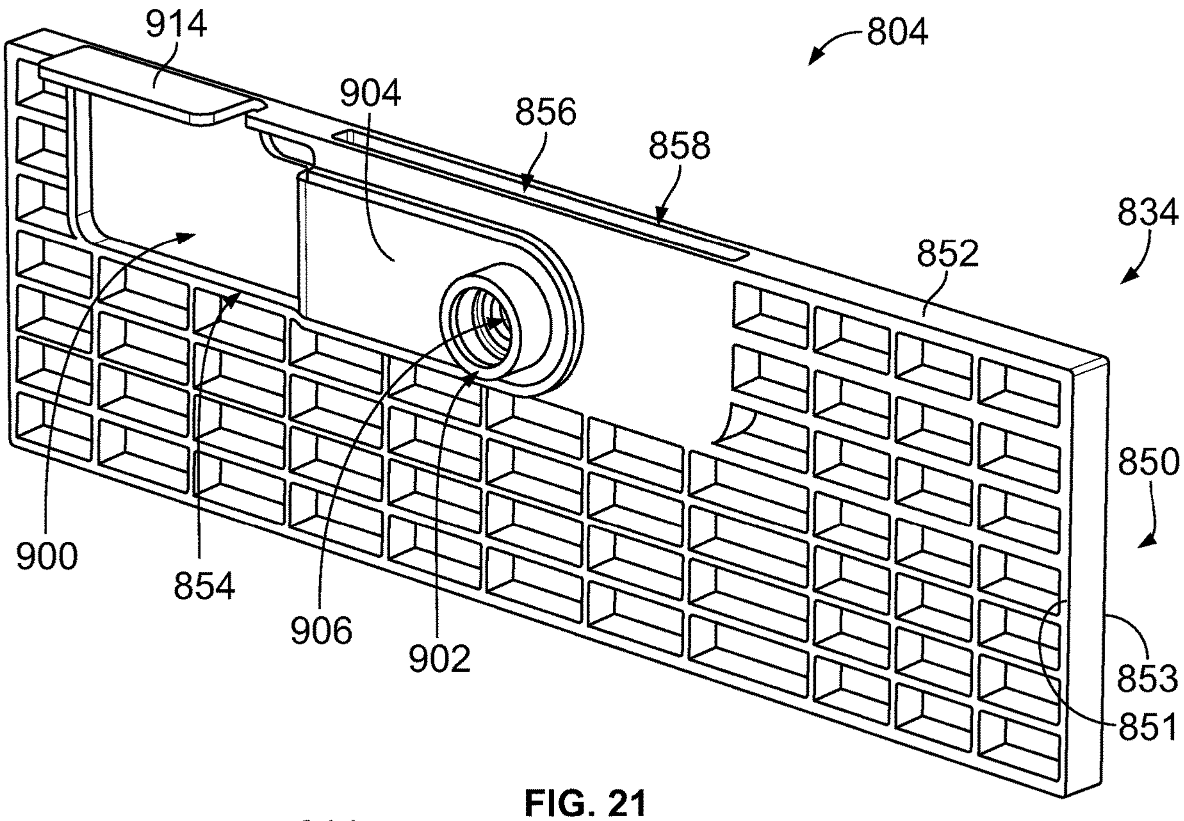
FIG. 21 is a perspective view of a portion of the battery module showing the busbar assembly coupled to the inner frame of the endplate in accordance with an exemplary embodiment.

FIG. 21 is a perspective view of a portion of the battery module 804 showing the busbar assembly 900 coupled to the inner frame 850 of the endplate 834. The inner frame 850 includes a frame body 852 having a front 851 and a rear 853. In an exemplary embodiment, the inner frame 850 includes a pocket 854 at the front 851 that receives the busbar assembly 900. In the illustrated embodiment, the busbar assembly 900 is provided at the front 851 in the pocket 854. However, in alternative embodiments, the frame body 852 may be formed around the busbar assembly 900 such that the frame body 852 at least partially encapsulates or surrounds the busbar assembly 900. For example, the frame body 852 may be overmolded over the busbar assembly 900. The battery terminal 902 extends forward of the frame body 852.

In an exemplary embodiment, the inner frame 850 includes a fluid manifold 856 within the frame body 852. The fluid manifold 856 receives fluid flow from the fluid manifold 906 of the battery terminal 902. In an exemplary embodiment, the inner frame 850 includes a port 858 open to the fluid manifold 856. In the illustrated embodiment, the port 858 is located at the top of the inner frame 850. Other locations are possible in alternative embodiments, such as at the rear 853. In various embodiments, fluid is supplied to the fluid manifold 856 through the battery terminal 902 and exits the inner frame 850 through the port 858. In other embodiments, fluid is supplied to the fluid manifold 856 through the port 858 and exits the inner frame 850 through the battery terminal 902.

In an exemplary embodiment, the busbar element 904 of the busbar assembly 900 extends from the battery terminal 902 to the terminal tab 914. In the illustrated embodiment, the terminal tab 914 is located at a top of the endplate 834 for electrical connection to the battery cells 820 of the battery module 804. The terminal tab 914 may be at other locations in alternative embodiments.

Figure 22:
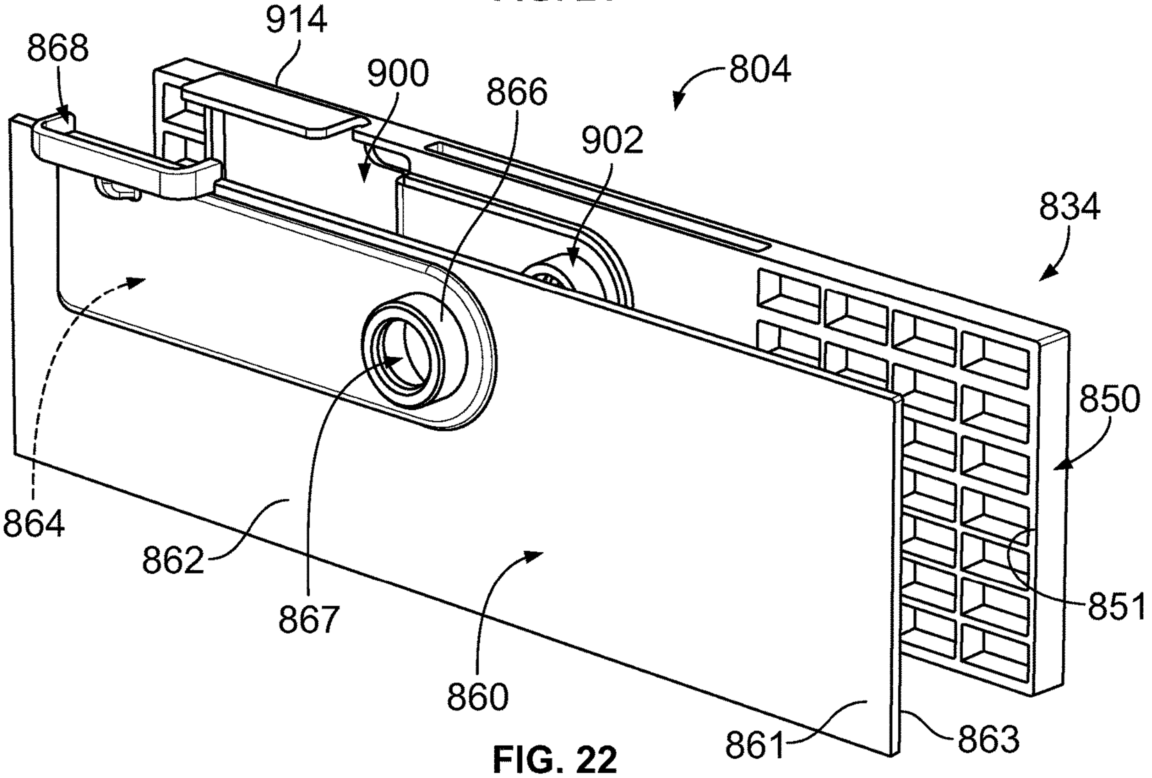
FIG. 22 is a perspective view of a portion of the battery module showing the outer housing poised for coupling to the inner frame in accordance with an exemplary embodiment.
Figure 23:
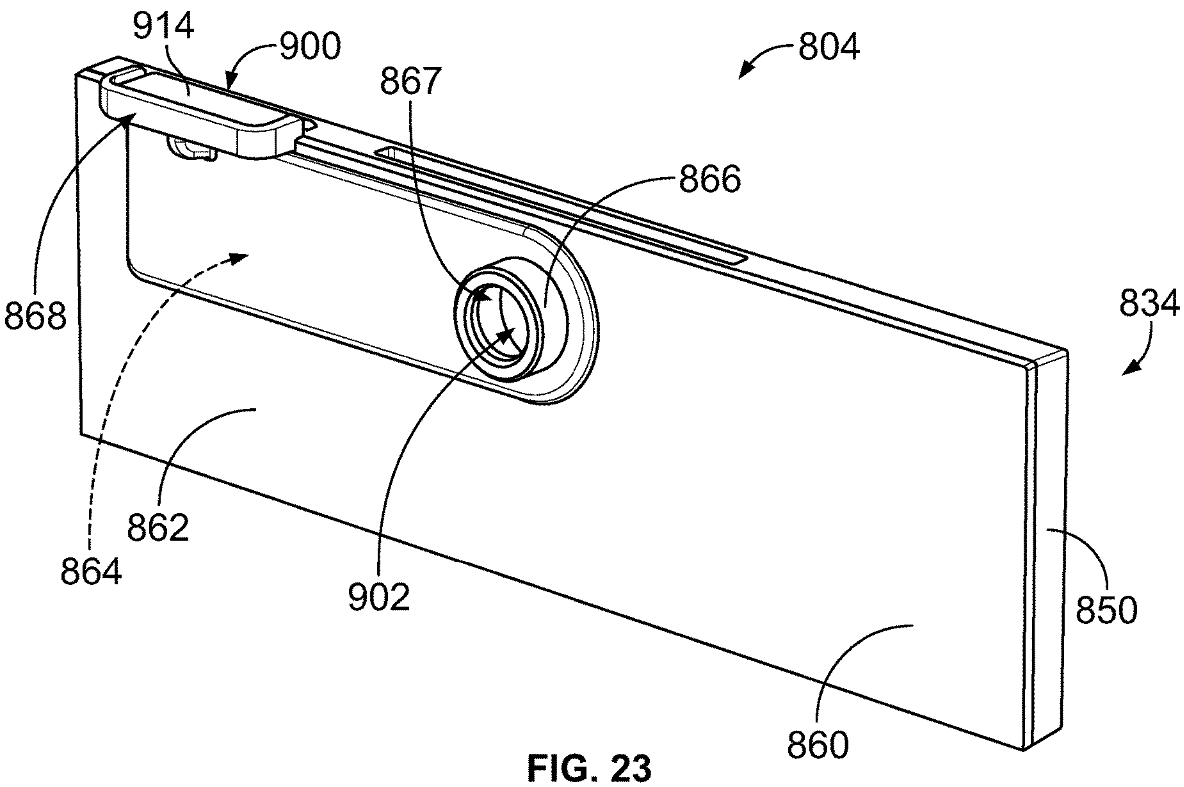
FIG. 23 is a perspective view of a portion of the battery module showing the outer housing coupled to the inner frame in accordance with an exemplary embodiment.

FIG. 22 is a perspective view of a portion of the battery module 804 showing the outer housing 860 poised for coupling to the inner frame 850. FIG. 23 is a perspective view of a portion of the battery module 804 showing the outer housing 860 coupled to the inner frame 850.

The outer housing 860 includes a panel 862 having a front 861 and a rear 863. The rear 863 is configured to be coupled to the front 851 of the inner frame 850. In an exemplary embodiment, the outer housing 860 includes a pocket 864 that receives a portion of the busbar assembly 900. In an exemplary embodiment, the outer housing 860 includes a shroud 866 extending from the front 861. The shroud 866 includes an opening 867 therethrough. The battery terminal 902 is received in the opening 867 and is surrounded by the shroud 866. The pin terminal 202 is configured to be plugged into the shroud 866 to mate with the battery terminal 902. In an exemplary embodiment, the outer housing 860 includes a tray 868 that receives the terminal tab 914. The tray 868 surrounds the terminal tab 914. In the illustrated embodiment, the tray 868 is located at the top of the outer housing 860. Other locations are possible in alternative embodiments.

In an exemplary embodiment, the outer housing 860 is manufactured from a dielectric material, such as a plastic material. The outer housing 860 covers the busbar assembly 900 and the battery terminal 902. The outer housing 860 makes the endplate 834 touch safe by covering the conductive portions of the busbar assembly 900 and the battery terminal 902.

Figure 24:
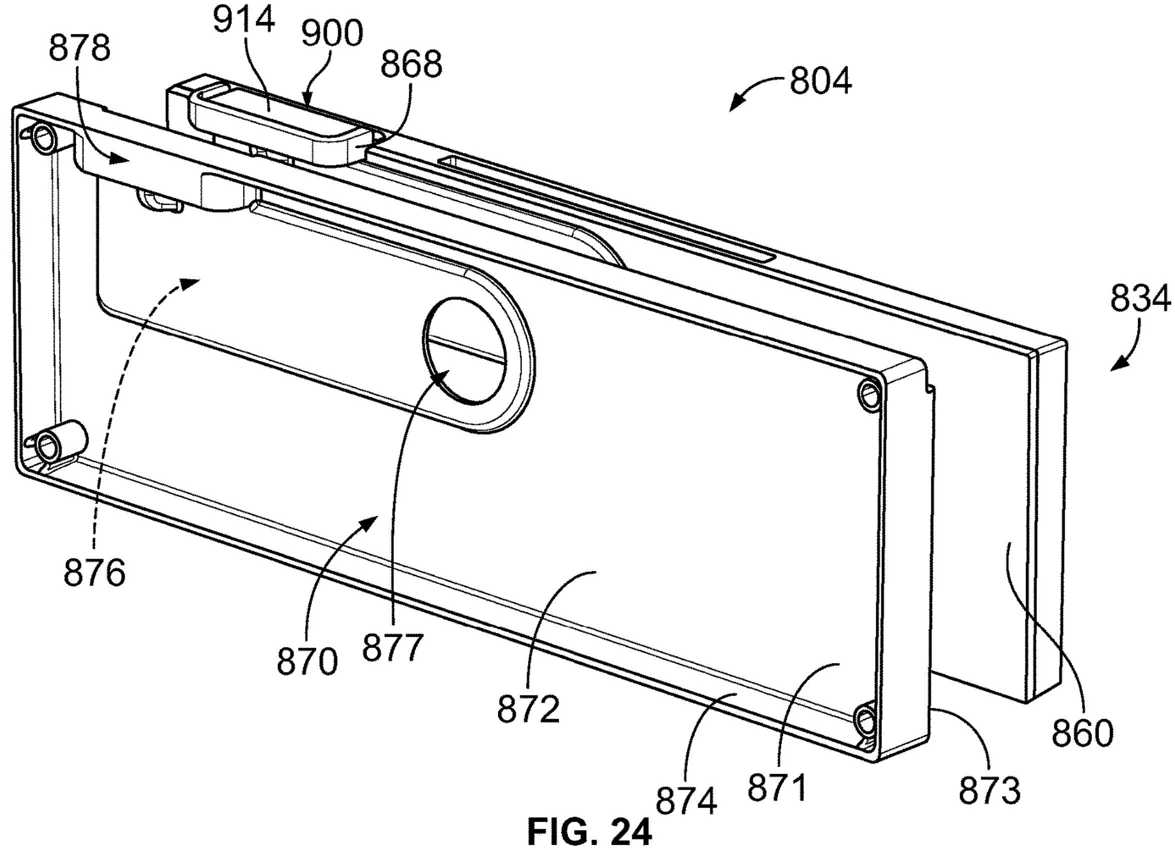
FIG. 24 is a perspective view of a portion of the battery module showing the cover poised for coupling to the outer housing in accordance with an exemplary embodiment.

FIG. 24 is a perspective view of a portion of the battery module 804 showing the cover 870 poised for coupling to the outer housing 860. The cover 870 includes an end wall 872 and a flange 874 surrounding the outer perimeter or edge of the end wall 872. The end wall 872 includes a front 871 and a rear 873. The rear 873 is configured to be coupled to the outer housing 860. In an exemplary embodiment, the cover 870 includes a pocket 876 that receives a portion of the outer housing 860 and/or a portion of the busbar assembly 900. In an exemplary embodiment, the cover 870 includes an opening 877 therethrough. The opening 877 receives the shroud 866 of the outer housing 860. In an exemplary embodiment, the cover 870 includes a tray 878 that receives the tray 868 and/or the terminal tab 914. The tray 878 may surround or cover the terminal tab 914. In the illustrated embodiment, the tray 878 is located at the top of the cover 870. Other locations are possible in alternative embodiments.

Figure 25:
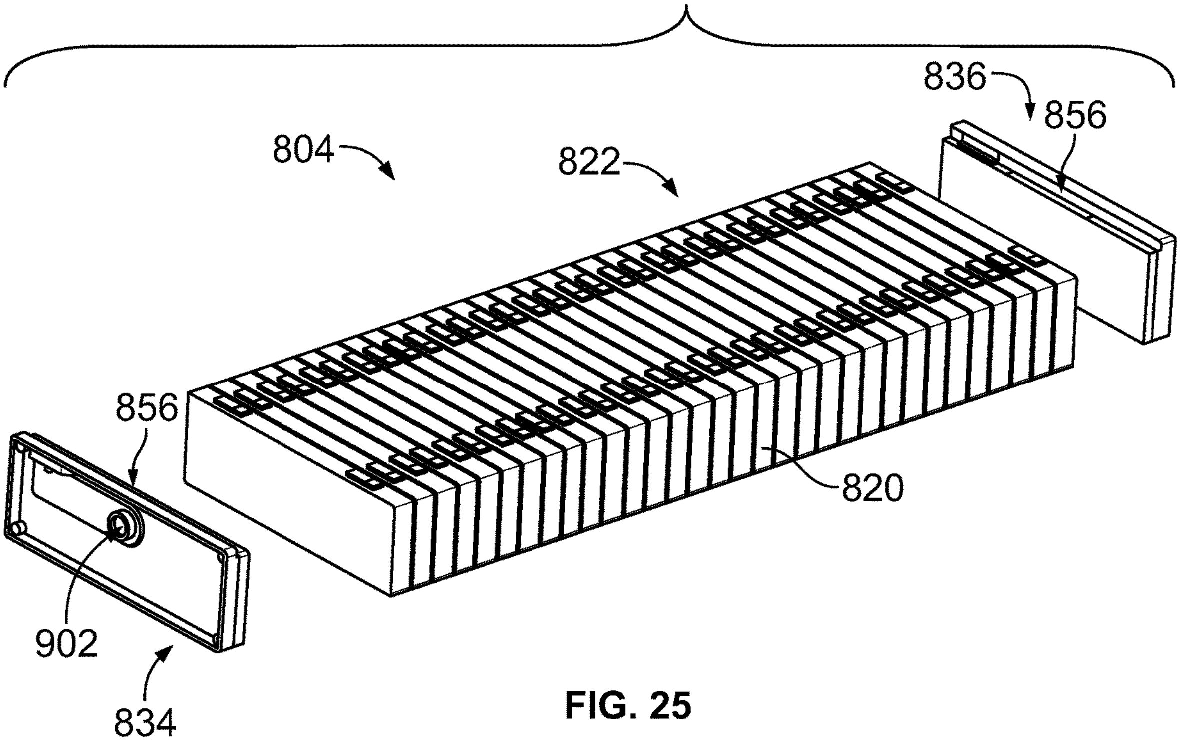
FIG. 25 is an exploded view of a portion of the battery module showing a pair of the endplates at opposite ends of the stack of the battery cells in accordance with an exemplary embodiment.

FIG. 25 is an exploded view of a portion of the battery module 804 showing a pair of the endplates 834, 836 at opposite ends of the stack 822 of the battery cells 820. The outer shell 832 (FIG. 15) is removed to illustrate the components of the battery module 804. The endplates 834, 836 are configured to cover the ends of the stack 822. The endplates 834, 836 allow fluid flow around the battery cells 820. For example, the endplate 834 defines an inlet endplate and the endplate 836 defines an outlet endplate. Fluid is able to flow into the inlet endplate 834, such as through the inlet battery terminal 902 and the fluid manifold 856, and out of the outlet endplate 836, such as through the fluid manifold 856 and the outlet battery terminal 902. The fluid flows across the stack of battery cells 820 to cool the components of the battery module 804.

Figure 26:
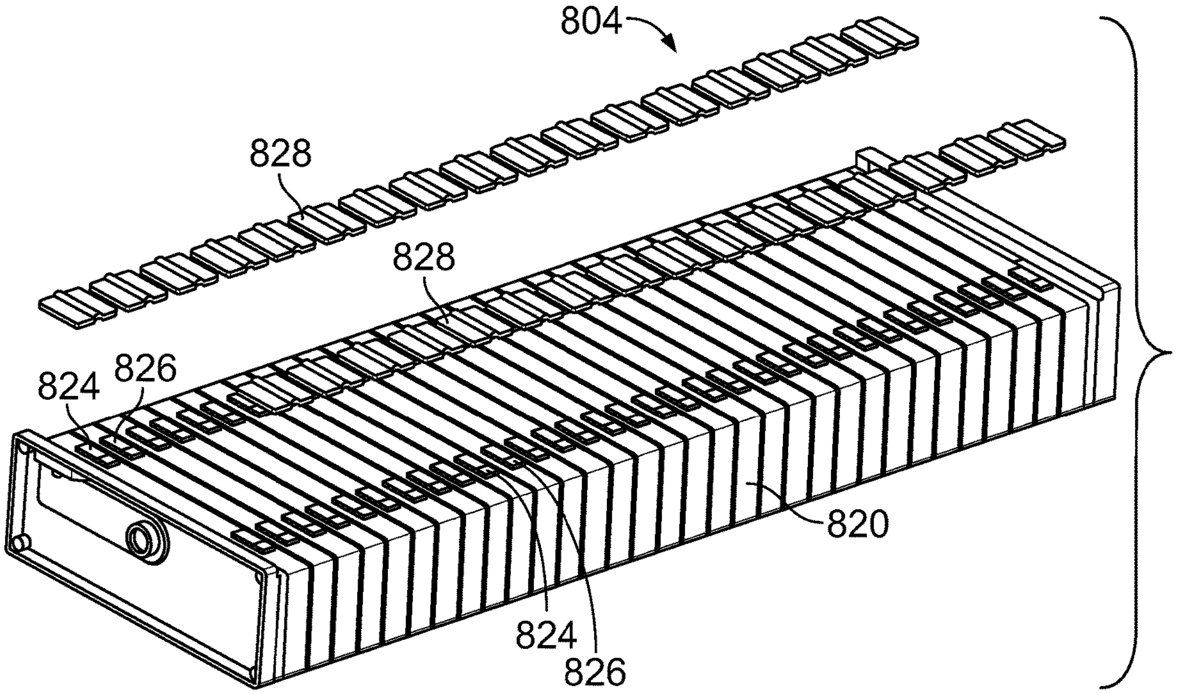
FIG. 26 is an exploded view of a portion of the battery module showing the cell busbars poised for coupling to the terminals of the battery cells in accordance with an exemplary embodiment.

FIG. 26 is an exploded view of a portion of the battery module 804 showing the cell busbars 828 poised for coupling to the terminals 824, 826 of the battery cells 820. The outer shell 832 (FIG. 15) is removed to illustrate the components of the battery module 804. The cell busbars 828 may be welded to the terminals 824, 826. The cell busbars 828 electrically connect the adjacent terminals 824, 826. The endplates 834, 836 allow fluid flow around the cell busbars 828 and the terminals 824, 826.

Figure 27:
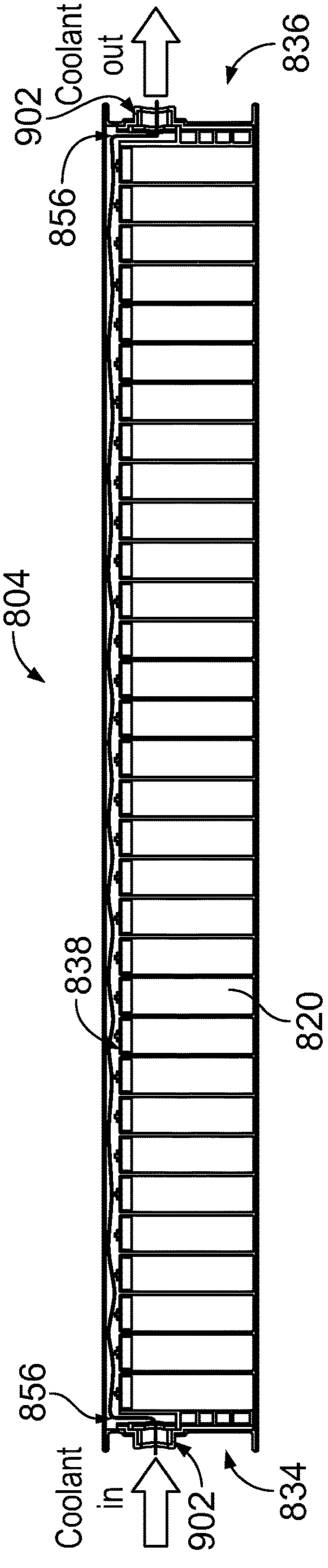
FIG. 27 is a cross-sectional view of the battery module in accordance with an exemplary embodiment.

FIG. 27 is a cross-sectional view of the battery module 804 in accordance with an exemplary embodiment. FIG. 27 illustrates a fluid path through the battery module 804. Fluid is able to flow into the cavity 838 through the inlet endplate 834. For example, fluid flows through the inlet battery terminal 902 and through the fluid manifold 856 into the cavity 838. The fluid may be supplied directly to the inlet battery terminal 902 through the cooling channel of the pin terminal 202 (not shown). The fluid flows along the battery cells 820 to cool the battery cells 820 and reduce charging time and/or increase vehicle performance. In the illustrated embodiment, the fluid is shown flowing across the tops of the battery cells 820. However, the fluid may flow along the sides and/or the bottom of the battery cells 820 within the cavity 838. The fluid exits the cavity 838 through the outlet endplate 836. For example, the fluid flows through the fluid manifold 856 and through the outlet battery terminal 902. The fluid may flow from the outlet battery terminal 902 directly into the mating power element, such as into a cooling channel of the pin terminal 202 (not shown).

Figure 28:
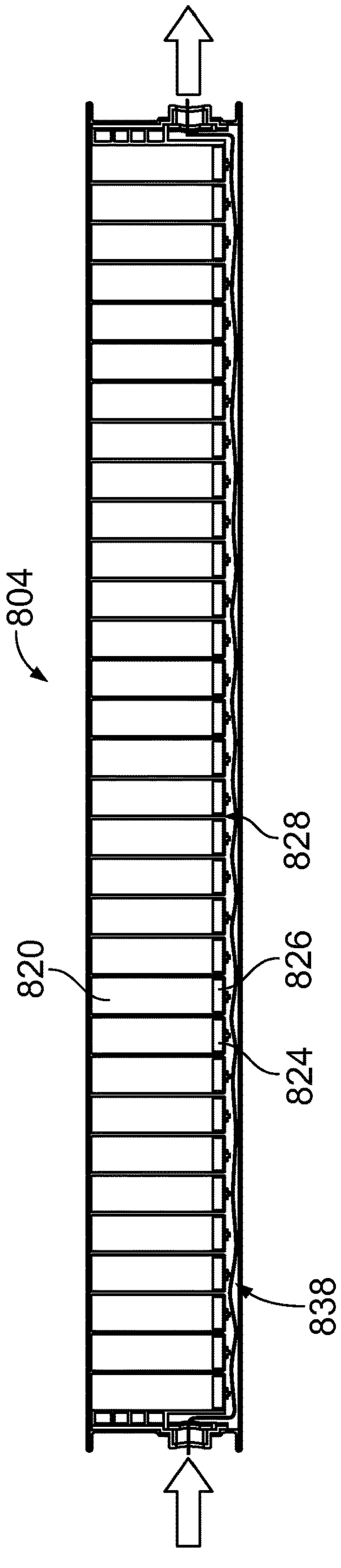
FIG. 28 is a cross-sectional view of the battery module in accordance with an exemplary embodiment.

FIG. 28 is a cross-sectional view of the battery module 804 in accordance with an exemplary embodiment. FIG. 28 illustrates the battery cells 820 with the terminals 824, 826 and the cell busbars 828 at the bottom of the battery cells 820. In the illustrated embodiment, the fluid path is shown along the bottom of the cavity 838. However, the fluid may additionally or alternatively flow along the sides of the battery cells 820 and/or along the tops of the battery cells 820.

Figure 29:
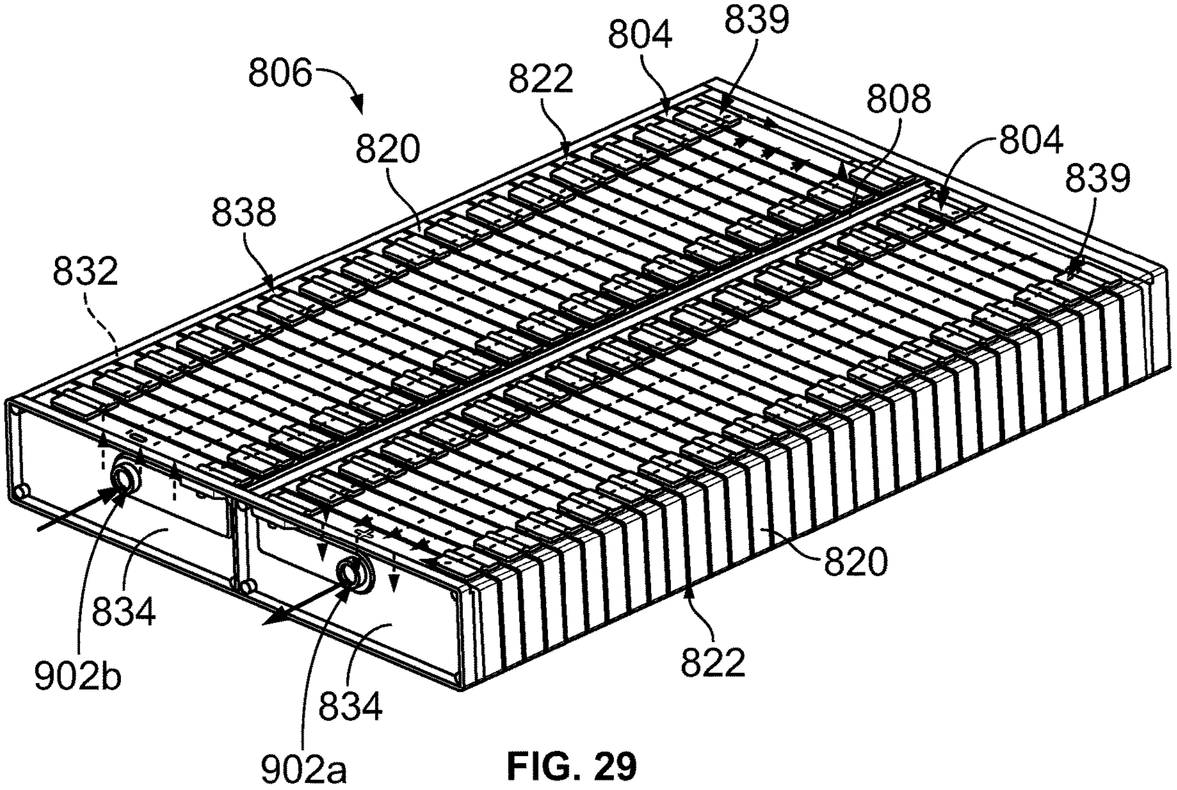
FIG. 29 is a front perspective view of a battery pack in accordance with an exemplary embodiment.
Figure 30:
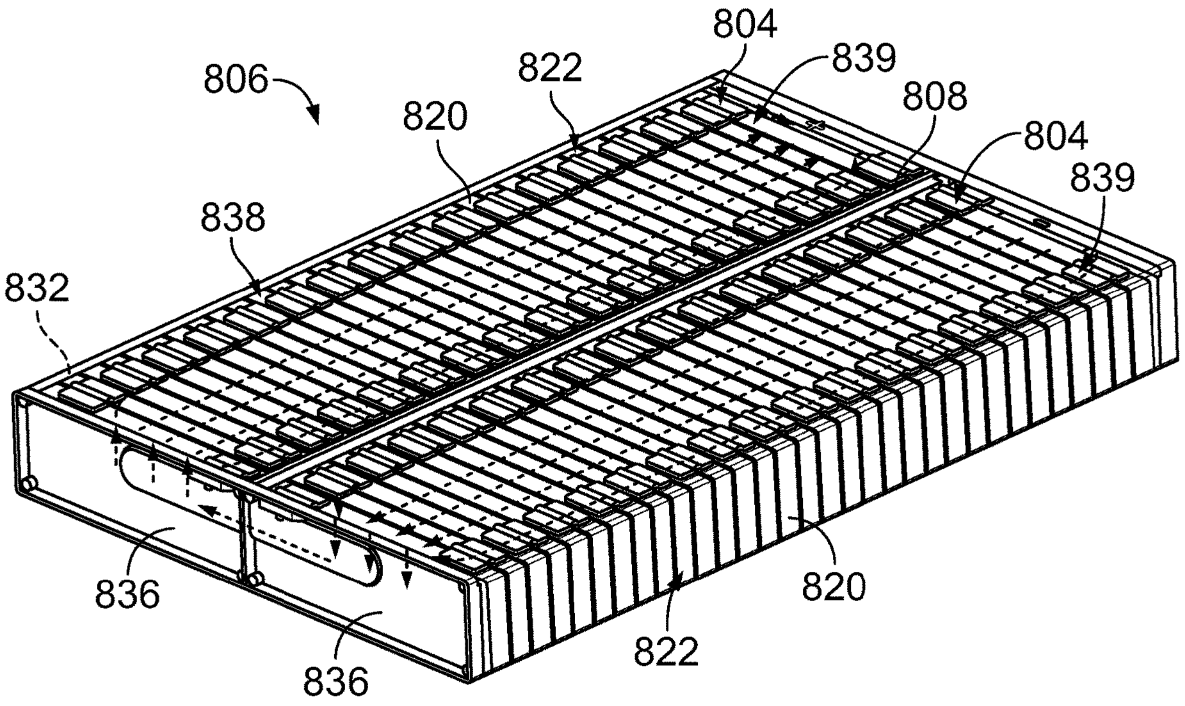
FIG. 30 is a rear perspective view of a battery pack in accordance with an exemplary embodiment.

FIG. 29 is a front perspective view of a battery pack 806 in accordance with an exemplary embodiment. FIG. 30 is a rear perspective view of a battery pack 806 in accordance with an exemplary embodiment. The battery pack 806 includes a plurality of the battery modules 804. In the illustrated embodiment, the battery pack 806 includes a pair of the battery modules 804 arranged side-by-side. In an exemplary embodiment, the battery pack 806 includes a single outer shell 832 (shown in phantom) that is shared by both battery modules 804. The battery pack 806 includes two of the stacks 822 of the battery cells 820 arranged within the same outer shell 832. A separating wall 808 is arranged between the stacks 822 of the battery cells 820. The battery pack 806 may include more than two stacks of the battery cells in alternative embodiments. In other various embodiments, multiple battery packs 806 may be stacked together.

In an exemplary embodiment, a plurality of the endplates 834 are arranged at the first end of the battery pack 806 and a plurality of the endplates 836 are arranged at the second end of the battery pack 806. In an exemplary embodiment, the endplates 834 at the first end are inlet/outlet endplate that provide an inlet or an outlet for fluid flow into the cavity 838. In the illustrated embodiment, the endplates 836 at the second end are connecting endplates that connect different chambers 839 of the cavity 838. Each chamber 839 holds a separate stack 822 of the battery cells 820. The chambers 839 are separated by the separating wall 808. The connecting endplates allow fluid flow between the chambers 839 for parallel fluid flow (flow from the front to the rear and circulates back to the front along parallel paths) through the battery pack 806. The battery case forms a closed loop cooling circuit between the battery terminals 902*a*, 902*b*. In alternative embodiments, the endplates 836 at the second end may be inlet/outlet endplates similar to the endplates 834, which allow series fluid flow (straight through from front to rear) within each chamber 839.

In the illustrated embodiment, the main positive and negative battery terminals 902*a*, 902*b* for the battery pack 806 are both arranged on the same end (for example, at the front). The battery terminal 902*a* may be the fluid flow inlet and the battery terminal 902*b* may be the fluid flow outlet for the battery pack 806, or vice versa.

Figure 31:
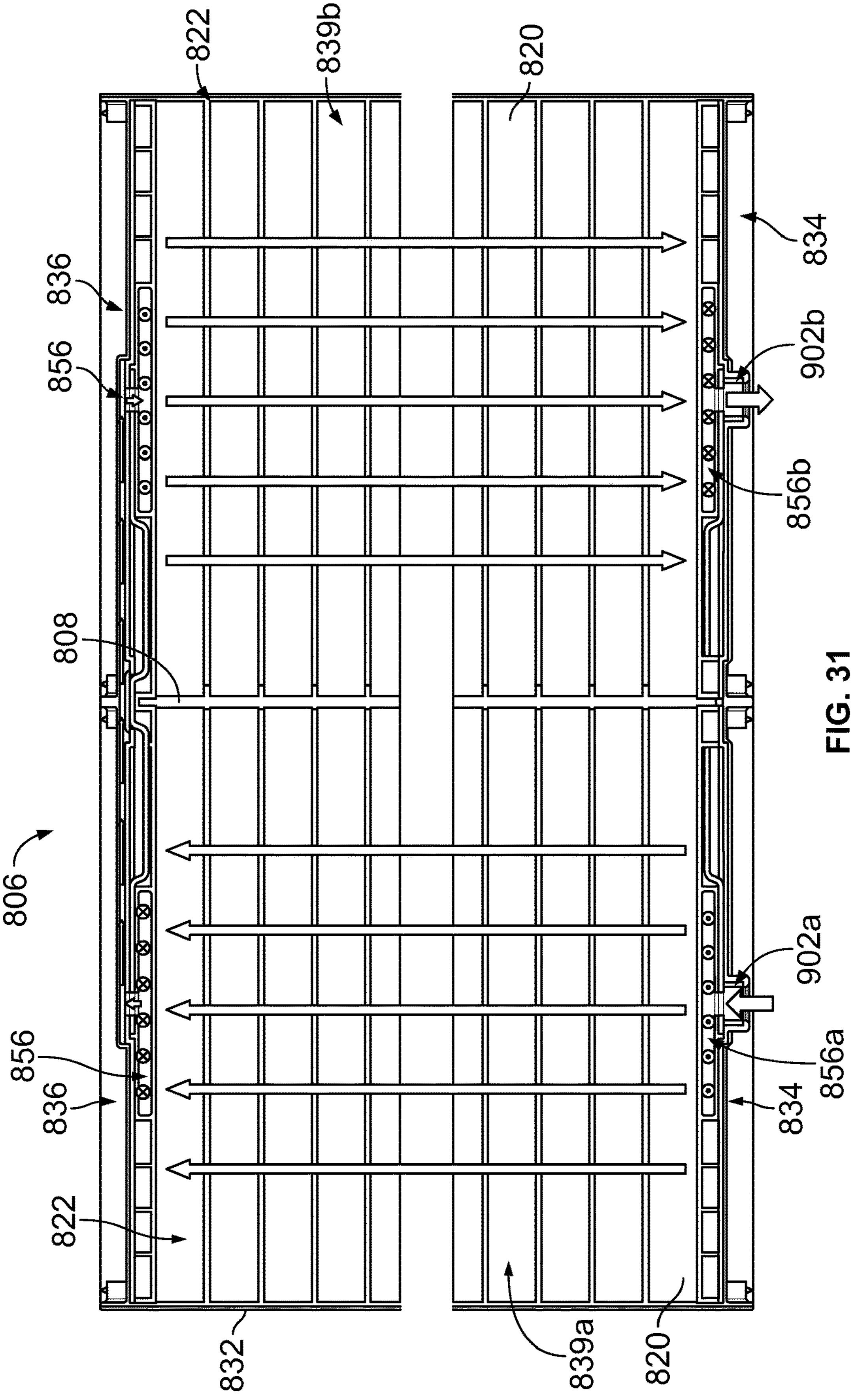
FIG. 31 is a cross-sectional view of the battery pack in accordance with an exemplary embodiment showing fluid flow through the battery pack.

FIG. 31 is a cross-sectional view of the battery pack 806 in accordance with an exemplary embodiment showing fluid flow through the battery pack 806. The battery pack 806 includes the stacks 822 of the battery cells 820 stacked side-by-side with the separating wall 808 therebetween. The inlet/outlet endplates 834 are provided at the front end of the outer shell 832. The connecting endplates 836 are provided at the rear end of the outer shell 832. The inlet/outlet endplates 834 hold the positive and negative battery terminals 902*a*, 902*b*, whereas the connecting endplates 836 do not include any battery terminals, but rather solely function to create fluid flow between the chambers 839.

In an exemplary embodiment, fluid flows into the inlet battery terminal 902*a* and is directed into the first fluid manifold 856*a*. The fluid exits the fluid manifold 856*a* and enters the first chamber 839*a* to flow to the rear end of the battery pack 806. The fluid enters the connecting endplates 836 through the fluid manifolds 856 and is transferred from the left side of the battery pack 806 to the right side of the battery pack 806. The fluid then exits the fluid manifold 856 into the second chamber 839*b* and flows to the front of the battery pack 806. The fluid exits the second chamber 839*b* into the second fluid manifold 856*b* and then exits the battery pack 806 through the outlet battery terminal 902*b*. The fluid flow through the chambers 839*a*, 839*b* is parallel and in opposite directions (for example front to rear and a rear to front).

In alternative embodiments, rather than having parallel flow, the battery pack 806 may have series flow in both chambers 839*a*, 839*b*. For example, the battery pack 806 may include two inlet battery terminals 902 both arranged at the front and to outlet battery terminals 902 both arranged at the rear to allow flow through the chambers 839*a*. 839*b* in the same direction.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A battery module comprising:

a battery case having a cavity configured to hold at least one battery cell, the battery case having a fluid manifold allowing cooling fluid flow through the cavity;

a battery terminal coupled to the battery case, the battery terminal configured to be electrically connected to the at least one battery cell, the battery terminal including a mating element configured to be mated to and electrically connected to a mating power element to electrically connect the mating power element and the at least one battery cell, the battery terminal including a cooling channel forming a fluid path through the mating element, the cooling channel being in flow communication with the fluid manifold for fluid flow through the battery case.

2. The battery module of claim 1, wherein the mating element is hollow to form the cooling channel and receive the fluid flow from the mating power element.

3. The battery module of claim 1, wherein the mating element forms one of a fluid inlet or a fluid outlet for the fluid manifold.

4. The battery module of claim 1, wherein the battery case includes an outer shell and an end plate forming the cavity, the end plate coupled to an end of the outer shell to close the end of the outer shell, the end plate having the fluid manifold allowing cooling fluid flow through the end plate.

5. The battery module of claim 4, wherein the end plate includes an inner frame and an outer housing coupled to the inner frame, the inner frame including a channel forming the fluid manifold, the battery terminal coupled to the inner frame with the cooling channel in flow communication with the channel of the inner frame.

6. The battery module of claim 4, wherein the end plate includes a fluid seal to seal the cooling channel.

7. The battery module of claim 4, wherein the end plate is sealed to the outer shell to seal fluid flow in the cavity.

8. The battery module of claim 1, wherein the battery terminal includes a busbar and a terminal tab extending from the busbar configured to be electrically coupled to the at least one battery cell, the mating element extending from the busbar, the busbar electrically connecting the mating element and the terminal tab.

9. The battery module of claim 1, wherein the battery terminal forms one of a fluid inlet and a positive battery terminal, or a fluid inlet and a negative battery terminal, or a fluid outlet and a positive battery terminal, or a fluid outlet and a negative battery terminal.

10. The battery module of claim 1, wherein the battery terminal forms a main battery terminal for the battery module.

11. The battery module of claim 1, wherein the mating element is a socket contact.

12. The battery module of claim 1, wherein the mating element is a pin contact.

13. The battery module of claim 1, further comprising a fluid supply tube in flow communication with the cooling channel to supply fluid to the cooling channel.

14. A battery module comprising:

a battery case having an outer shell forming a cavity configured to hold at least one battery cell, the battery case including an end plate coupled to an end of the outer shell to close the end of the outer shell, the end plate having a fluid manifold allowing cooling fluid flow through the end plate;

a battery terminal coupled to the end plate, the battery terminal configured to be electrically connected to the at least one battery cell, the battery terminal including a mating element configured to be mated to and electrically connected to a mating power element to electrically connect the mating power element and the at least one battery cell, the battery terminal including a cooling channel forming a fluid path through the mating element, the cooling channel being in flow communication with the fluid manifold for fluid flow through the battery case.

15. The battery module of claim 14, wherein the end plate includes an inner frame and an outer housing coupled to the inner frame, the inner frame including a channel forming the fluid manifold, the battery terminal coupled to the inner frame with the cooling channel in flow communication with the channel of the inner frame.

16. The battery module of claim 14, wherein the end plate includes a fluid seal to seal the cooling channel.

17. The battery module of claim 14, wherein the end plate is sealed to the outer shell to seal fluid flow in the cavity.

18. The battery module of claim 14, wherein the battery case forms a closed loop cooling circuit.

19. A battery module comprising:

a battery case having an outer shell forming a cavity configured to hold at least one battery cell, the battery case including an inlet end plate coupled to the outer shell, the inlet end plate having an inlet fluid port in flow communication with at least one fluid manifold, the battery case including an outlet end plate coupled to the outer shell, the outlet end plate having an outlet fluid port in flow communication with the at least one fluid manifold;

a first battery terminal coupled to the inlet end plate, the first battery terminal configured to be electrically connected to the at least one battery cell, the first battery terminal including a first mating element configured to be mated to and electrically connected to a first mating power element to electrically connect the first mating power element and the at least one battery cell, the first battery terminal including a first cooling channel forming a fluid path through the mating element, the first cooling channel being in flow communication with the inlet fluid port for fluid flow through the battery case; and a second battery terminal coupled to the outlet end plate, the second battery terminal configured to be electrically connected to the at least one battery cell, the second battery terminal including a second mating element configured to be mated to and electrically connected to a second mating power element to electrically connect the second mating power element and the at least one battery cell, the second battery terminal including a second cooling channel forming a fluid path through the mating element, the second cooling channel being in flow communication with the outlet fluid port for fluid flow through the battery case.

20. The battery module of claim 19, wherein the inlet end plate and the outlet end plate or on opposite sides of the outer shell to allow series fluid flow through the battery case.

21. The battery module of claim 19, wherein the inner end plate and the outer end plate are on the same side of the outer shell to allow parallel fluid flow through the battery case.

22. The battery module of claim 19, wherein the battery case forms a closed loop cooling circuit between the first battery terminal and the second battery terminal.

* * * * *